US007672760B2

(12) United States Patent
Solberg et al.

(10) Patent No.: US 7,672,760 B2
(45) Date of Patent: Mar. 2, 2010

(54) SEARCHLIGHT

(75) Inventors: Lars Andre Solberg, Trondheim (NO); Jonas Aamodt Moræus, Trondheim (NO)

(73) Assignee: Aptomar AS, Trondheim (NO)

( * ) Notice: Subject to any disclaimer, the term of this patent is extended or adjusted under 35 U.S.C. 154(b) by 1014 days.

(21) Appl. No.: 11/285,298

(22) Filed: Nov. 23, 2005

(65) Prior Publication Data

US 2007/0091609 A1 Apr. 26, 2007

(30) Foreign Application Priority Data

Sep. 6, 2005 (NO) .................................. 20054131

(51) Int. Cl.
*B60L 15/00* (2006.01)

(52) U.S. Cl. ............................ 701/21; 701/23; 701/34; 318/17; 318/51; 318/54; 318/55; 318/103; 307/157; 315/127; 315/254; 315/259; 315/317; 342/52; 348/143; 348/159

(58) Field of Classification Search ................... 701/21, 701/23, 34; 318/17, 51, 54, 55, 103, 189, 318/547; 315/127, 254, 295, 317; 307/157; 342/152; 348/143, 159
See application file for complete search history.

(56) References Cited

U.S. PATENT DOCUMENTS 2,345,135 A * 3/1944 Lippman .................... 307/157
3,096,056 A * 7/1963 Allison ................... 246/187 A
3,979,649 A 9/1976 Persha
4,010,560 A * 3/1977 Diggs .......................... 37/308
4,858,080 A 8/1989 Oikawa
D327,953 S 7/1992 Jordan
6,016,120 A 1/2000 McNabb et al.
6,377,211 B1 4/2002 Hsiung
6,505,574 B1 1/2003 Naud et al.
6,903,676 B1 * 6/2005 Frady et al. ................... 342/52
7,049,998 B1 * 5/2006 Frady et al. ................... 342/52

FOREIGN PATENT DOCUMENTS

DE 202 07 444 U1 9/2003
DE 103 20 837 A1 11/2003
EP 1 152 921 B1 11/2001

OTHER PUBLICATIONS

Thomlin, From searchlights to radar-the story of anti-aircraft and coastal defence development, 1988, IEEE, p. 110-124.*
Notification Concerning the Transmittal of International Preliminary Report on Patentability for PCT/NO2006/000309, 1 page (mailed Mar. 11, 2008).
International Preliminary Report on Patentability for PCT/NO2006/000309, 1 page (mailed Mar. 11, 2008).
Written Opinion for PCT/NO2006/000309, 4 pages (mailed Mar. 11, 2008).
Universitetsavisa, "Fra avhandling til kommers" Jun. 13, 2005, http://www.universitetsavisa.no/ua_lesmer.php?kategori=nyheter&dokid=42aebf1e682600.78817378.

* cited by examiner

*Primary Examiner*—Khoi Tran
*Assistant Examiner*—McDieunel Marc
(74) *Attorney, Agent, or Firm*—Rothwell, Figg, Ernst & Manbeck, PC

(57) ABSTRACT

A searchlight (3) on board a vessel (1) arranged for illuminating a point (2*p*) and maintain said point (2*p*) illuminated regardless of the movements of said vessel (1).

18 Claims, 22 Drawing Sheets

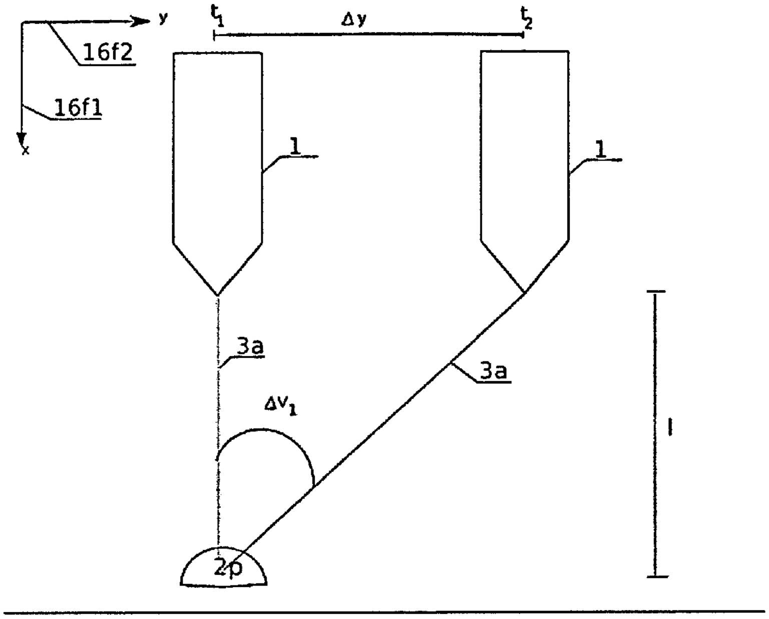
Fig.8_1
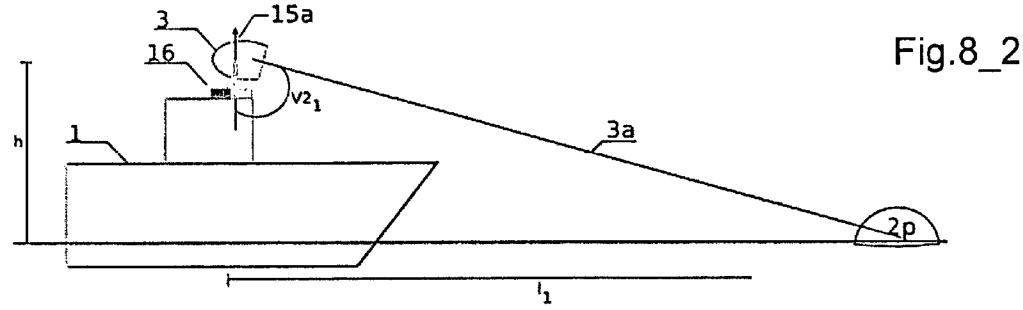
Fig.8_2
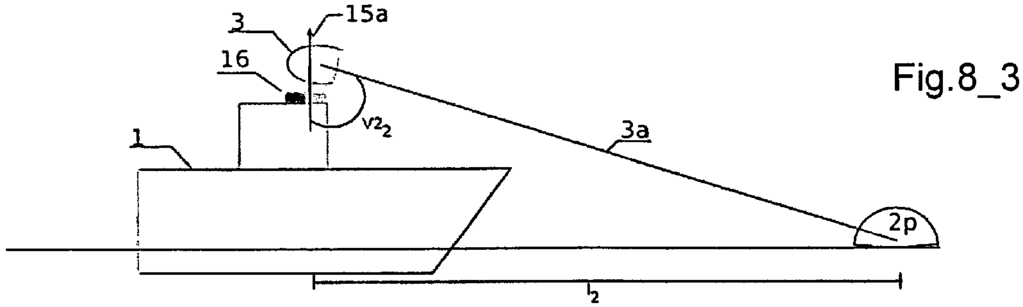
Fig.8_3
$t_1$ $t_2$

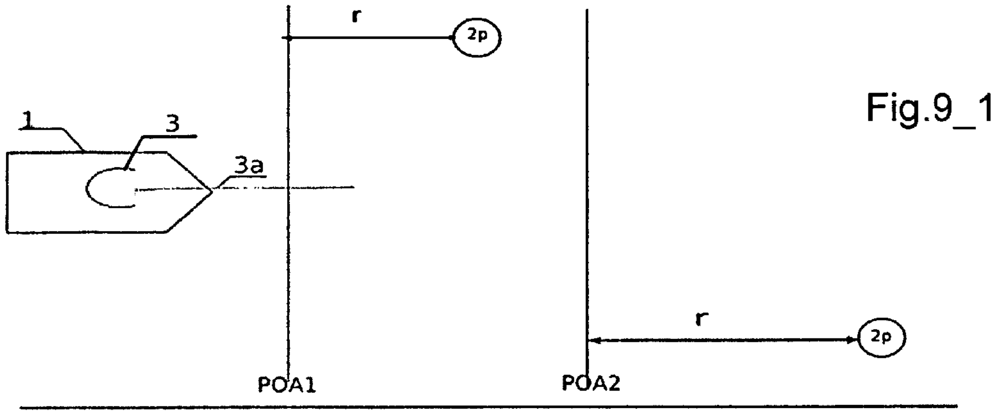
Fig.9_1
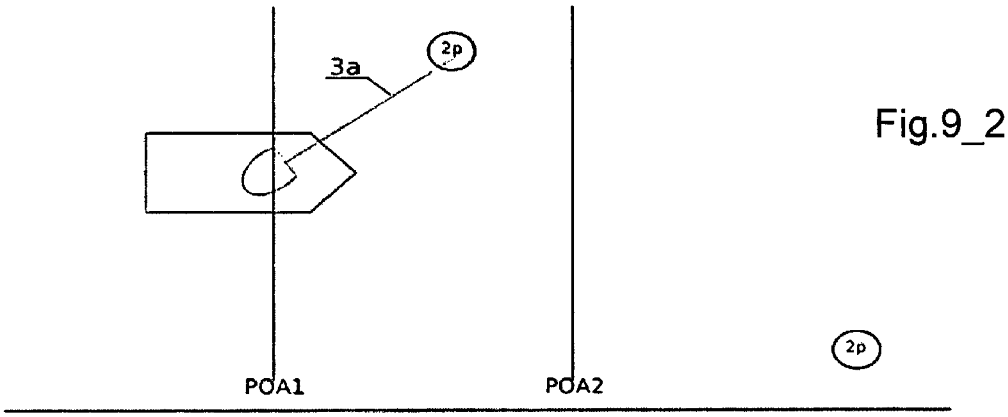
Fig.9_2
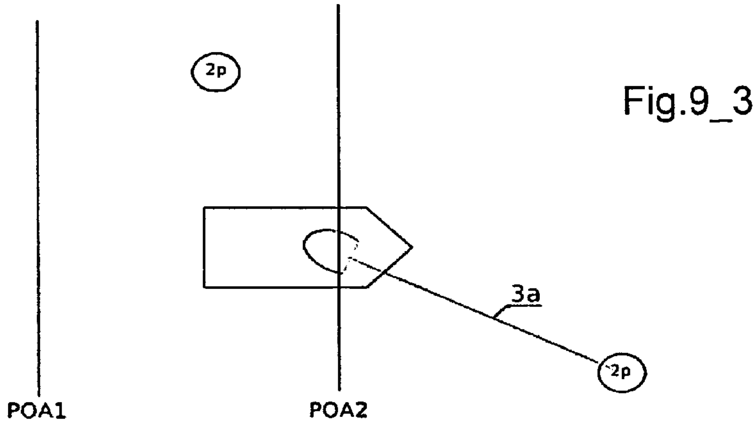
Fig.9_3

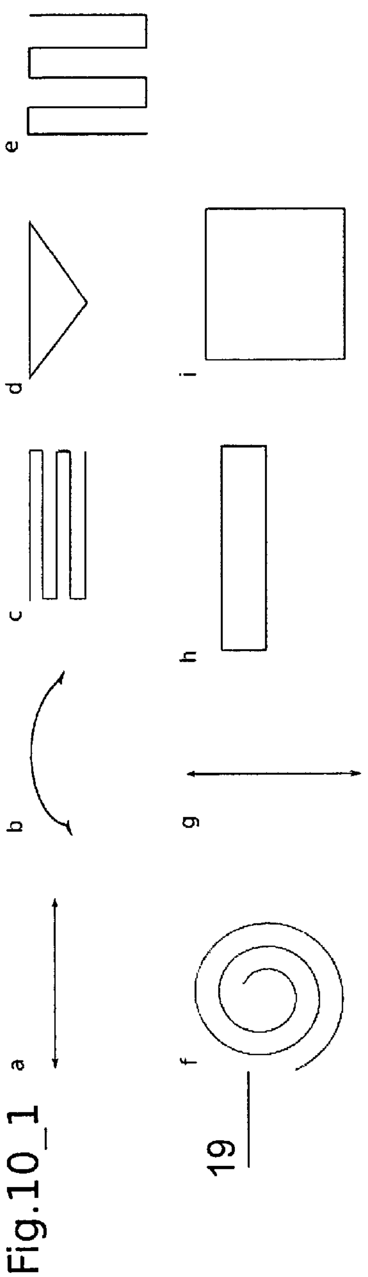
Fig.10_1
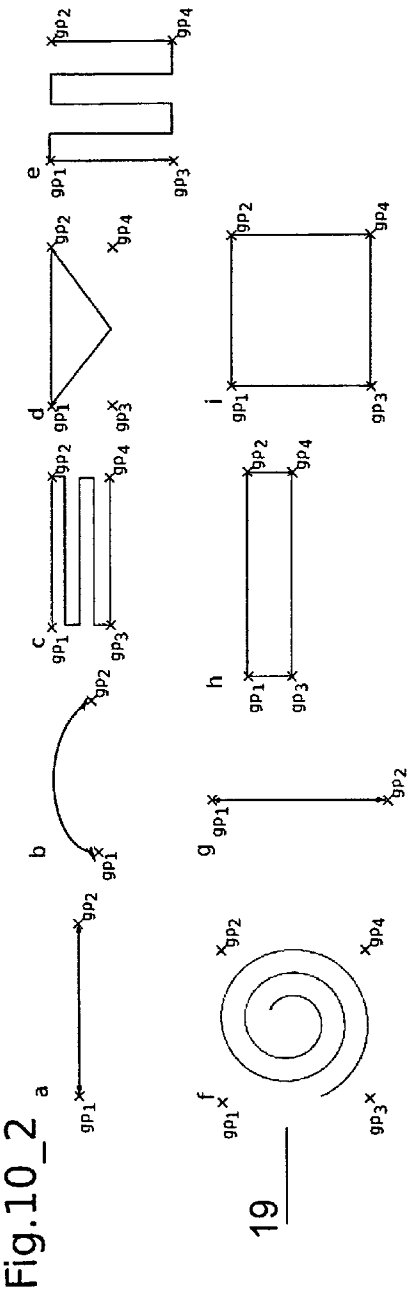
Fig.10_2

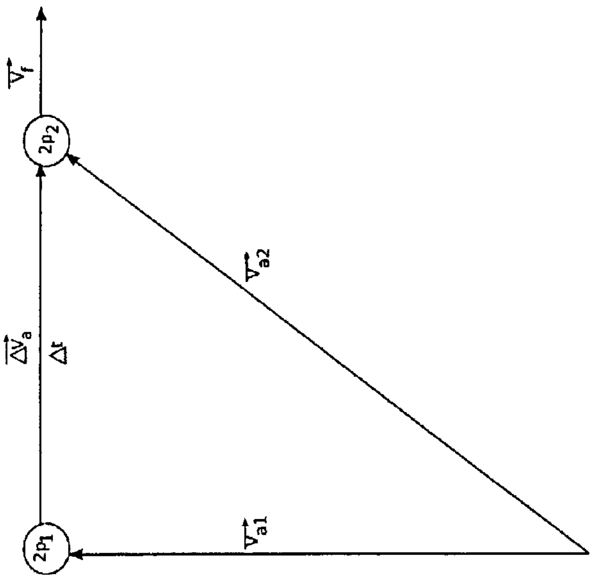
Fig.11_2
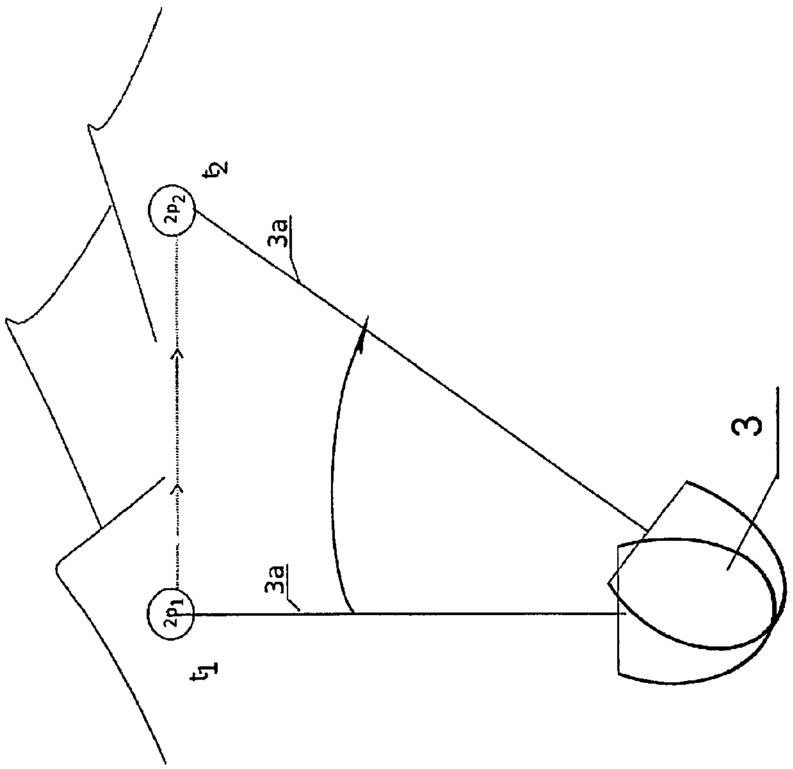
Fig.11_1

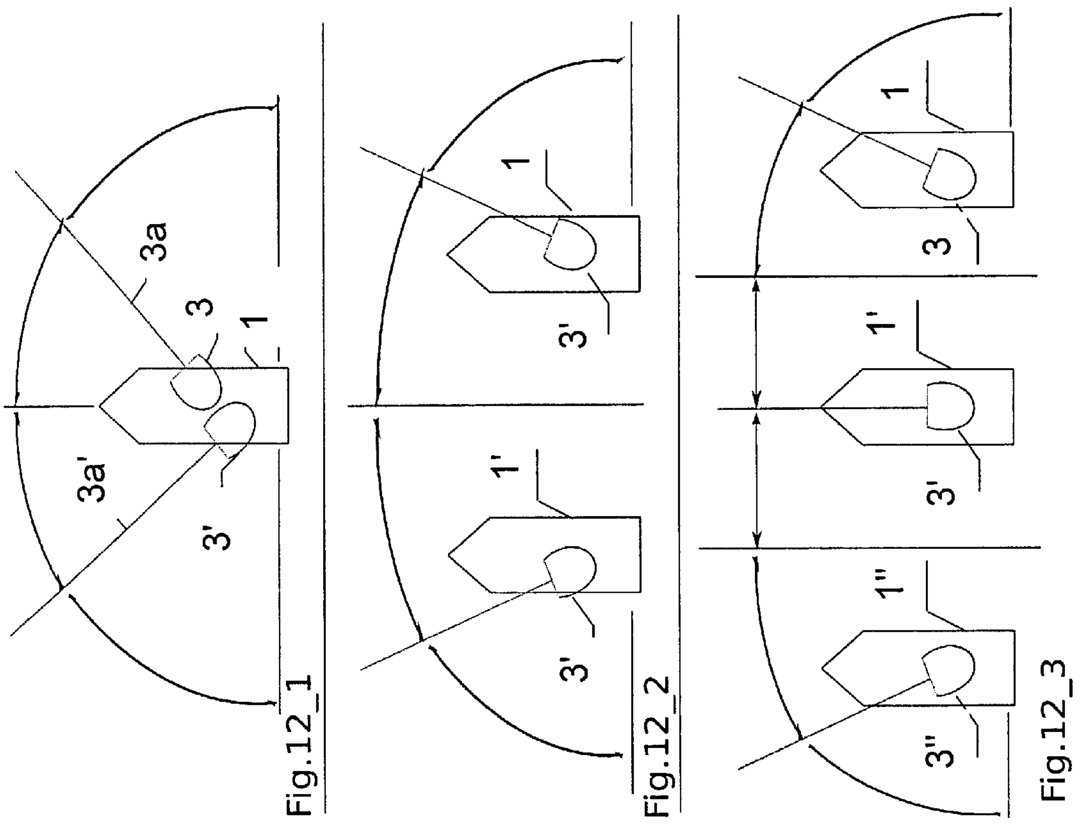
Fig.12_1
Fig.12_2
Fig.12_3

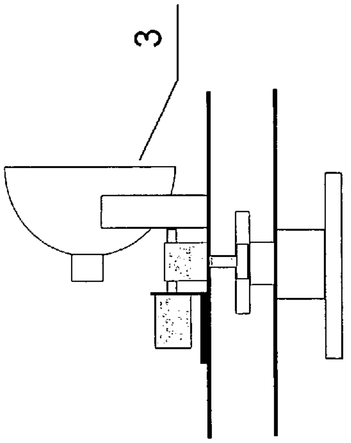
Fig. 13_1
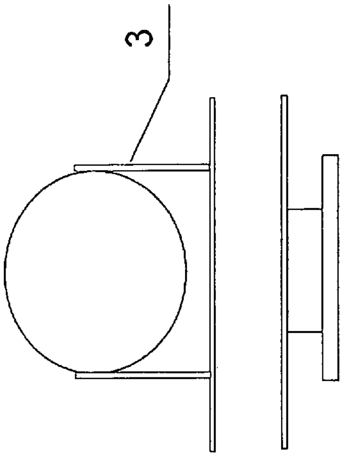
Fig. 13_2
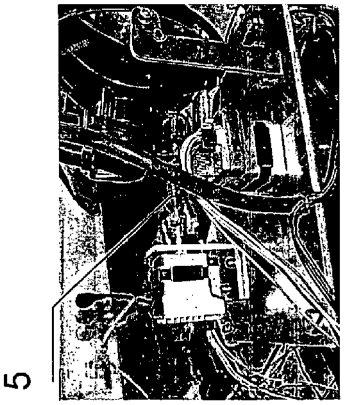
Fig. 14_1
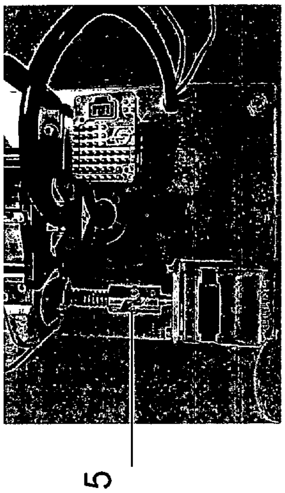
Fig. 14_2

SEARCHLIGHT

INTRODUCTION

When searching for persons and/or objects floating in the sea it is customary to use searchlights when the light conditions necessitate this. It is however difficult to keep the searchlight directed towards a point in the sea when the vessel is moving either by its' own power or due to weather, current and wave conditions. This is especially true as the vessel usually drives, rolls, pitches and heaves in the waves. To lose the position of the person or object one has found by means of the searchlight would be dire. There is thus a need for a searchlight which automatically compensates for the movements said vessels.

The present invention describes a searchlight for use on board a moving vessel in the sea, or other moving vessel. Said searchlight is arranged for illuminating a point or position or an object which is situated on the surface of the sea, and maintain said illumination even though said vessel is moving. In a search situation, be it a rescue operation, while searching for icebergs, reefs or buoys, or during a docking operation it is also desirable to be able to perform controlled search patterns which result in both large and small surfaces being illuminated as accurately as possible. By steering the beam axis in a desired pattern in which said search pattern is unbounded, or in which said search pattern is bounded by global position, or in which said search pattern is bounded by given areas or areas bounded relatively to the boats placement, a more effective and precise search is achieved than one may perform by means of the prior art.

DESCRIPTION OF BACKGROUND ART

EP 1152921 describes a searchlight arranged for being mounted on e.g. a helicopter, in which said searchlight by means of two motors is arranged for being rotated up and down with respect to a vertical plane, but is limited to shining from the horizontal, to downwards to the almost vertical. From the EP patent applications' column 2 line 22 is cited: "In the side view of the preferred embodiment of the lighthead (2), the adjustable extension range θ of the lighthead (2) is shown. Preferably, the adjustable extension range θ of the lighthead (2) is between approximately 0 degrees and approximately 120 degrees, and more preferably is approximately 80 degrees." This makes said searchlight unsuitable as a searchlight on a ship, as such a searchlight must be able to shine upwards with respect to the deck plane during roll movements and pitch movements at sea, which the EP patent can not perform when it is mounted on board a ship. The patent does not describe a method for adjusting the position of said searchlight with respect to the vessels roll- and pitch movements.

U.S. Pat. No. 3,979,649 describes logic circuits for commanding a searchlight from two different command consoles, but does not provide a solution to the problem to be addressed towards an object or point in the sea.

DE 20207444 is a German utility model which describes a searchlight which allegedly, without furnishing any constructive details or algorithms, furnishes a system which is supposed to be arranged for keeping said searchlight directed towards the same geographic location independently of said vessels location and inclination. Page 3 second paragraph describes the following:

"Through collection of measurement data (of ship velocity and course, and roll, pitch, and roll measurements and data analysis, the electromagnetic drive gears of said searchlight are thus controlled in such a manner as for keeping the searchlight cone directed towards this location, and completely without the operating person having to furnish further control signals." In the German utility model several essential elements which would be necessary for the implementation of the desired method as described are however lacking. Firstly the German utility model does not take into account said searchlights height above the sea level, or height or placement with respect to the vessels main axes. Said height is a completely vital parameter which must be known to be able to maintain said searchlight directed towards a point in the sea which distance initially is unknown. If said searchlights elevation above the axis-centre of the boat is not taken into account, it will not be possible to compute said searchlights' movement if said vessel is subjected to pitch or roll movements, and thus said searchlight will not be able to keep the light directed towards the same point in the water. For searches e.g. from helicopters, knowing the elevation is essential. Secondly the searchlight according to the German utility model does not compensate for said vessels' heave movement. Such a heave movement is always present to a larger or lesser degree. It is of cardinal importance to compensate said searchlights movement with respect to said vessels heave movement, especially if the illuminated object is situated a long distance from said searchlight. Thirdly, the German utility model does not take into account said searchlights location on said vessel with respect to said vessel main axes. Especially for roll movements this will be critical, as said searchlight may be arranged high up and to the side of said vessels mass centre. Furthermore there will be a large influence on the beam axis point of intersection with the sea surface if said searchlight is arranged far forward or aft in said vessel and said vessel has a large pitch movement. Thus the placement of said searchlight is a completely essential parameter which must be taken into account if the searchlight is to compensate for the movements of said vessel. If this is not taken into account, said searchlight must be arranged in said vessels mass centre, i.e. the centre of said vessels rotational movement about its three main axes for the angle calculations of the compensation of said searchlights for said vessels movement to be correct. This is not practically feasible. Thus the German utility model only compensates for pitch, roll and yaw, whereas the present invention compensates for surge, swing, heave, pitch, roll and yaw.

In the German utility model not either is a method described for calculation of which control signals from said control system to the motors of said searchlight would be necessary to maintain said searchlights beam axis directed against a point in the sea. The utility model application is thus so rudimentary that the described method hardly may be performed in any adequate manner as it is presented without adding substantial elements, and thus would not be possible to perform for a person skilled in the art without adding substantial new elements. The method is also likewise described in a similar German patent.

To illustrate the disadvantages the German utility model presents, the calculation examples have been used. The results from the calculation examples are shown illustrated in FIG. 19-FIG. 31. A computer has been used to simulate how said vessel, searchlight, searchlight beam axis and said illuminated point on the surface of the sea moves over a calculation time span of 30 seconds.

Example 1 describes an imagined situation in which said vessel (1) is at rest at the position 60:00:00 N and 4:00:00 E. Said searchlight is arranged with at the centre of said boats length, 10 meters starboard for said boats longitudinal axis, and 8 meters above the sea level. An object is observed at a point (2*p*) 2.3" E of said vessel (1), and said beam axis (3*a*) is arranged for intersecting with the water surface at the point (2*p*). Said vessel (1) has no translatory movements, it has no surge or swing movement, and has the following other movements: the pitch angle fluctuates between plus 5 degrees and minus five degrees, the roll angle fluctuates between plus 10 degrees and minus 10 degrees, and the yaw angle plus 4 degrees and minus 4 degrees. FIG. 19 shows said vessels (1) resulting movements represented by the parameters pitch, roll and yaw, FIG. 23 shows resulting computed angles (4*a*, 4*b*) of said beam axis, FIG. 24 show a vector coinciding and parallel with said beam axis (3*a*) in which said beam axis intersects with the water surface. This shows that an algorithm according to the German utility model in that respect will give a vector which points with a constant direction in space but which due to lack of parameters will move sideways with respect to the direction of said vector. FIG. 25 shows said vessels (1) position, defined by a cross, and the point where said beam axis (3*a*) intersects with the water surface according to what the German utility model may result in given our example.

The simulation illustrated in FIG. 24 shows that according to DE 20207444 the searchlight will be stabilised in pitch, roll and yaw and the direction of said beam axis (3*a*) will be maintained constant. On the other hand, according to the German utility model, deviations due to said searchlights (3) placement on said vessel (1), said searchlights (3) height over the water level or said searchlights (3) movement in space due to said vessels (1) pitch, roll yaw and heave movement are not computed. FIG. 25 shows that said beam axis (3*a*) according to the German utility model thus will not intersect with the water surface in the same point over a period of time and thus can not keep said beam axis (3*a*) directed towards the same stationary point (2*p*) in time. This rapid movement is unsuitable during searches.

Example 2 describes an imagined situation in which said vessel (1) begins in a point 60:00:00 N and 4:00:00 E. An object (2*p*) is observed at 2.3" E of said vessel (1), and said beam axis (3*a*) is so directed as to intersect with the water surface in said point (2*p*). Said vessel (1) runs ahead with a speed of 6 knots, at the same time as the course is changed from 0 degrees to 30 degrees, so that the final position becomes 23 meters east and 88 meters north of the initial position. Said vessel has the following other movements: Pitch angle plus 5 degrees and minus 5 degrees, roll angle plus 10 degrees and minus 10 degrees and yaw angle plus 4 degrees and minus 4 degrees. FIG. 19 shows said vessels (1) movements in pitch, roll and yaw; FIG. 29 shows the calculated angles of said beam axis (4*a*, 4*b*). FIG. 30 shows a vector which is coincidental with and parallel to said beam axis (3*a*), in which its direction intersects with the water surface at a point. FIG. 31 shows said vessels (1) position, in which said vessels initial and final positions are given by crosses, and the point in which said beam axis (3*a*) intersects with the water surface.

The simulation illustrated in FIG. 30 shows that according to DE20207444 said searchlight will be stabilised in pitch, roll and yaw, and the direction of said beam axis (3*a*) will be maintained constant. However, according to the German utility model, no deviation due to said searchlights (3) placement on board said vessel, said searchlights (3) height above the water level, or said searchlights (3) movement in space due to said vessels (1) pitch, roll, yaw, and heave movement is calculated. FIG. 31 shows that said beam axis (3*a*), according to the German utility model, will not intersect with the water surface at the same point, and thus is not able to keep said beam axis (3*a*) directed towards the same point (2*p*). FIG. 31 clearly illustrates that said searchlight according to DE20207444 is little suitable to performing searches at sea, and that the intention of the invention can not be fulfilled such as the method is rudimentary described in the German utility model.

USD 327,953 is a design application showing a searchlight.

U.S. Pat. No. 650,574 describes a method for compensating for vertical sea induced movements during crane operations at sea, in which said method comprises measurements of the vessels pitch, heave and roll movements, for later to recalculate these movements to a from a crane hanging loads' vertical velocity from said vessel, until finally furnishing signals to a motor which is arranged for countering said vessels vertical movements by corresponding inverse movements. The patent does not however describe problems related to said cranes placement on board said vessel, and the technical solution described assumes that said crane is arranged in said boats mass centre. Any displacement of said cranes placement with respect to said boats mass centre will render the described calculations imprecise and thereby complicate the crane operations as described in the patent. Nor does the patent describe compensation for other spatial movements other than said vertical movement of said crane load, and thus will not be able to compensate for surge, sway and yaw movements, compensation of which is of vital importance to the present invention.

The background art is not able to solve the problem of directing a searchlight towards an object or a point in the sea, and maintain said illumination towards said point while the vessel bearing said searchlight simultaneously drives and performs rotational and translatory movements.

SHORT SUMMARY OF THE INVENTION

The abovementioned problems are remedied by using a searchlight according to the invention for use on a moving vessel, in which said searchlight is arranged for transmitting a light beam with a beam axis which is arranged for illuminating a point or position of an object situated on the surface of the sea.

Said searchlight is arranged in a given height above the sea, and is rotatable about a perpendicular axis with respect to a base plane with a reference direction, and a base plane parallel axis which is parallel to said base plane.

Said beam axis of said searchlight is arranged for being rotated about said perpendicular axis and said base plane parallel axis for steering said beam axis towards said point.

Said beam axis is equipped with a first motor for movement of said beam axis about said perpendicular axis and a second motor for movement of said beam axis about said base plane parallel axis.

Said searchlight further comprises a control unit arranged for receiving measurements from the following:

- a first heading sensor for measurement of the angle of said beam axis projected down onto said base plane with respect to said reference direction
- a second heading sensor for measurement of the angle of said beam axis with respect to said perpendicular axis,
- vessel movement sensors for measurement of said vessels' rotational angles, in which said vessel movement sensors comprise one or more of a yaw sensor, a roll sensor and a pitch sensor,
- a positional sensor, e.g. a GPS-receiver which calculates geographical longitude and latitude in a coordinate system, a heave sensor arranged for computing said vessels heave position;

Said control unit is arranged for, on the basis of the received measurements of said vessels movements, said vessels position and said searchlights orientation and position on said vessel, to further calculate and furnish control signals to said motors for rotation of said beam axis about said perpendicular axis and said base plane axis so that said beam axis is kept directed towards a desired point on the sea while said vessel is moving.

SHORT FIGURE DESCRIPTION

The invention is illustrated in the attached figures which are solely meant to illustrate the invention, but shall not be construed to be limit the scope of the inventions which shall only be limited by the patent claims.

Figure 2:
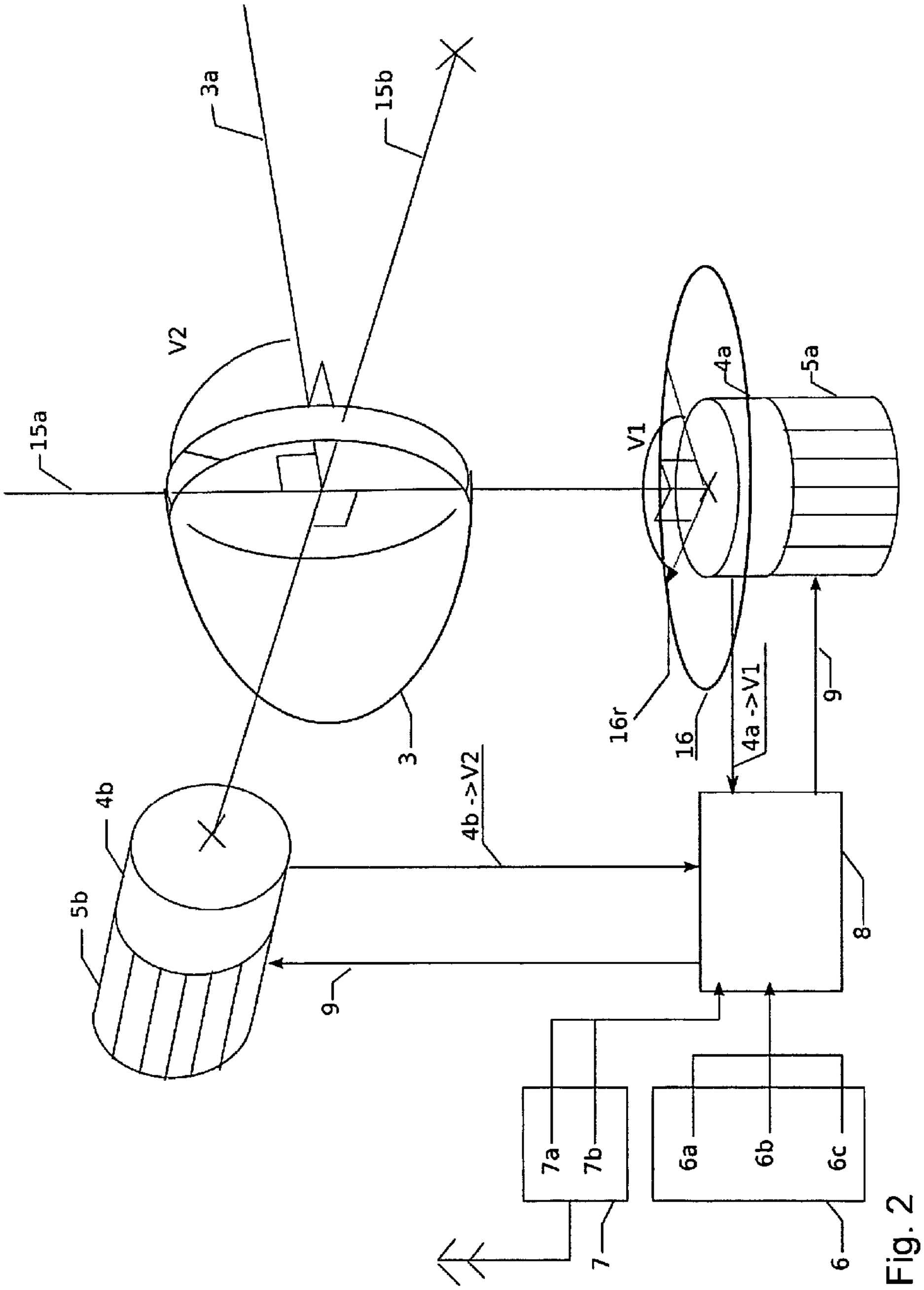

FIG. 2 shows a system overview for a searchlight (3) arranged for being rotated about an initially vertical axis called perpendicular axis, in which said so called perpendicular axis is perpendicular to a base plane with a reference mark. Said searchlight (3) is arranged for being tilted about an initially horizontal axis for rotating said beam axis (3*a*) upwards or downwards with respect to said base plane. A control unit (8) for receiving sensor signals (17), positions etc, is also shown, which again furnishes control signals to motors (5) for rotating and tilting said searchlight (3) with its' beam axis (3*a*).

Figure 3:
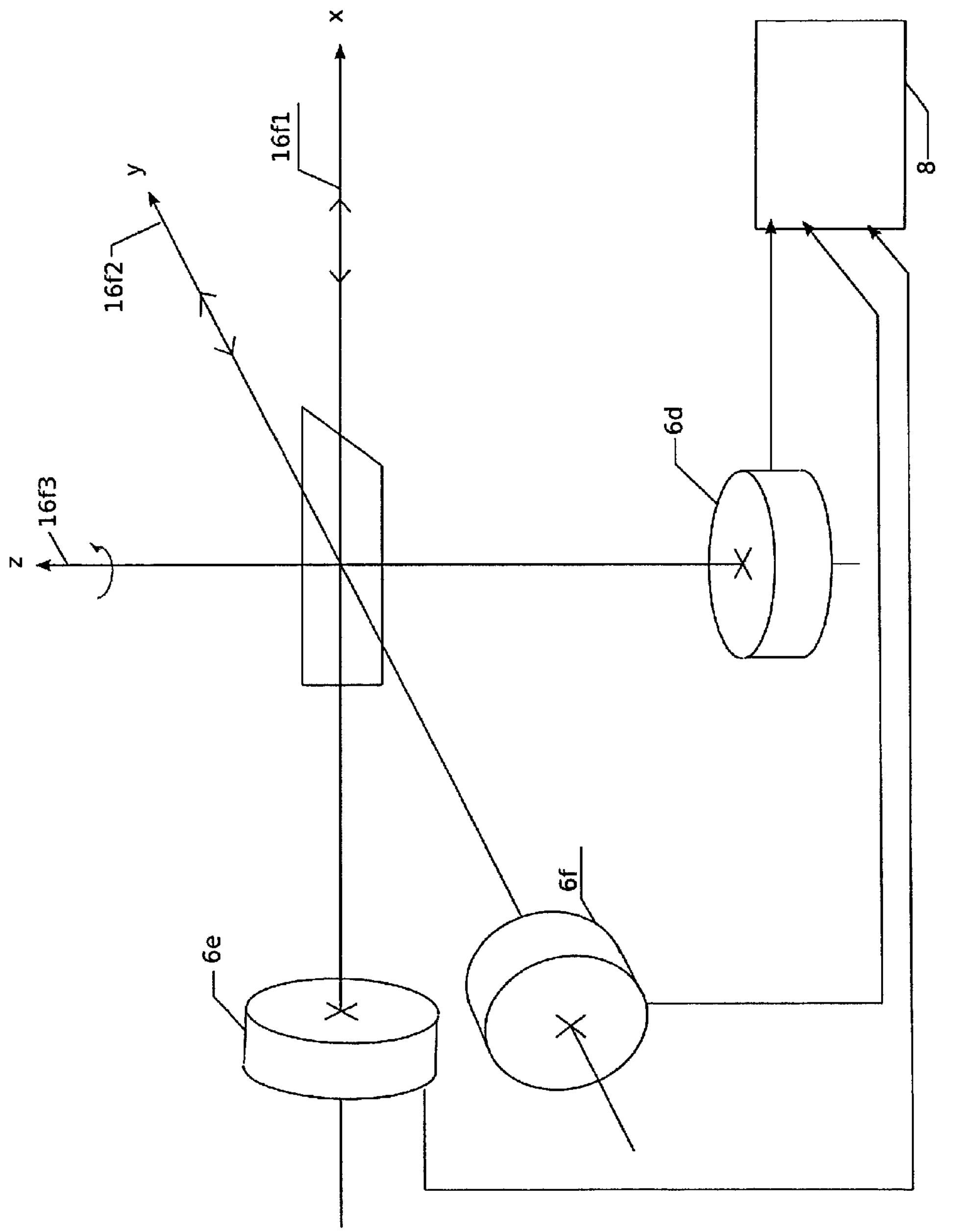

FIG. 3 illustrates said vessels (1) coordinate system with sensors (6) for measurement of pitch, roll and yaw about the ships 3 main axes x, y and z as well as sensors (6) for measurement of the translational movements surge (alongst the x-axis/length axis), sway (along the y-axis/transversal axis) and heave (along the z-axis, vertical axis).

Figure 4:
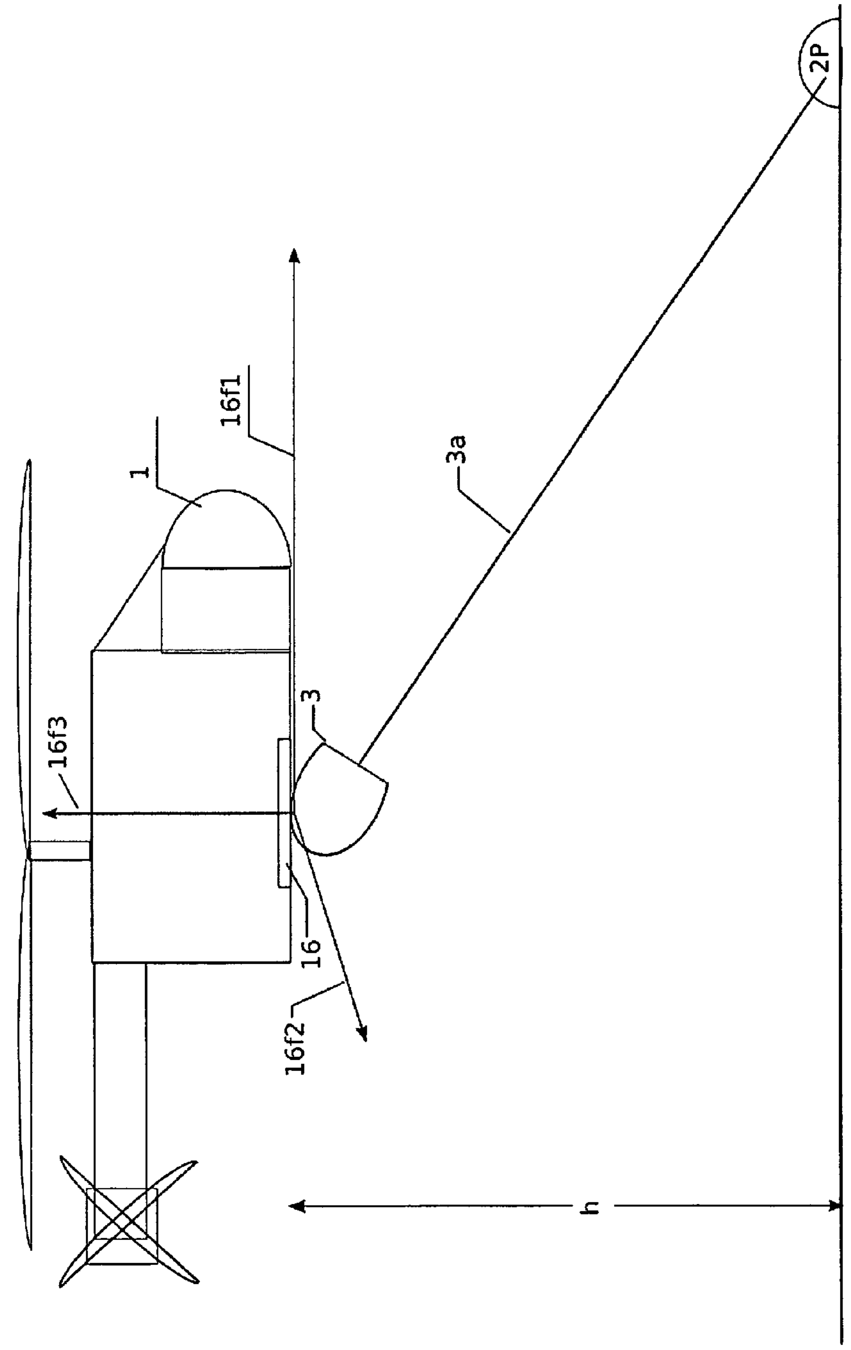

FIG. 4 illustrates a searchlight (3) according to the invention, in which said searchlight is arranged on a helicopter for use in searches.

Figure 5:
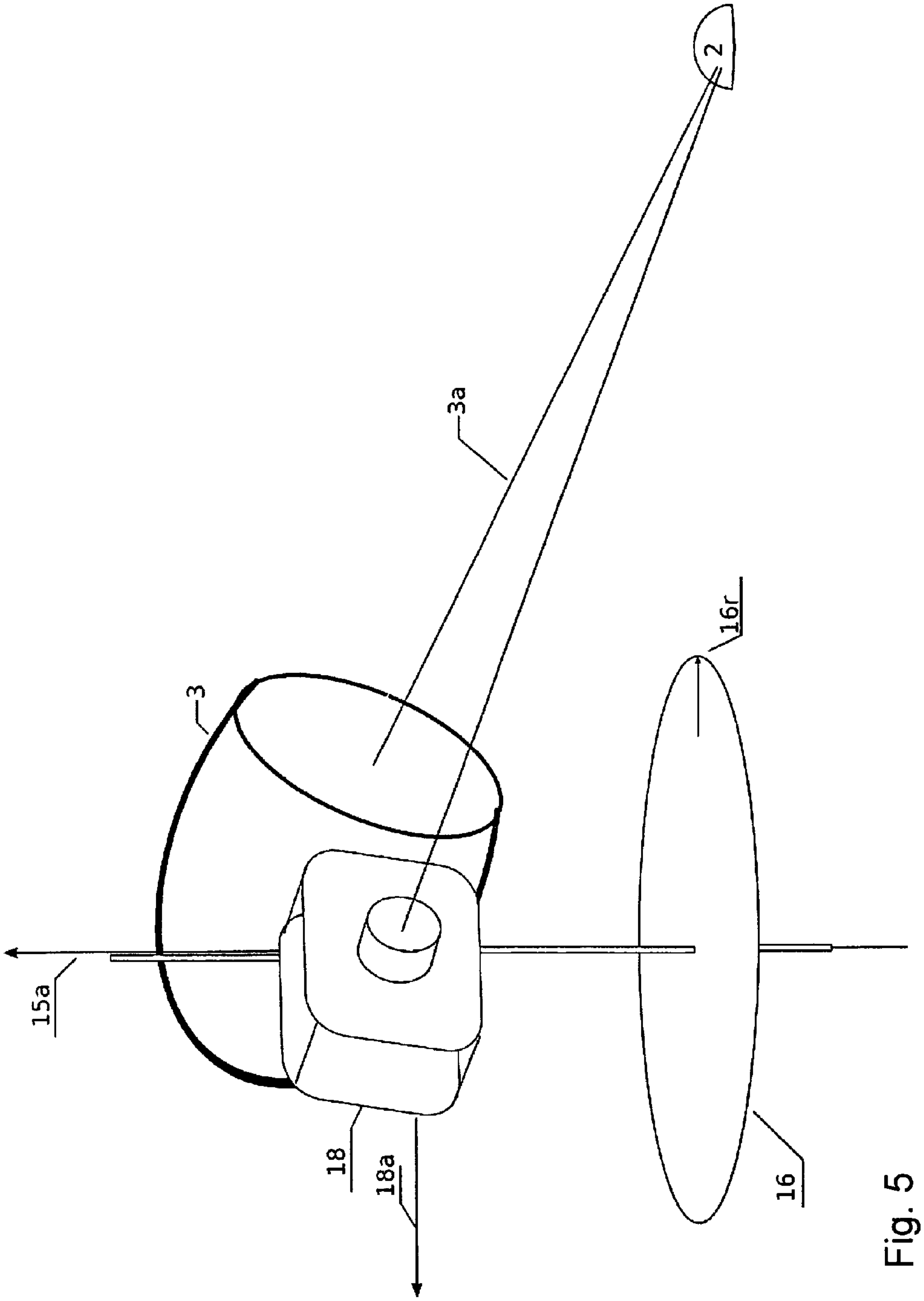

FIG. 5 shows a camera (18) mounted with its' lens axis arranged mainly parallel to said searchlights' (3) beam axis (3*a*).

Figure 6A:
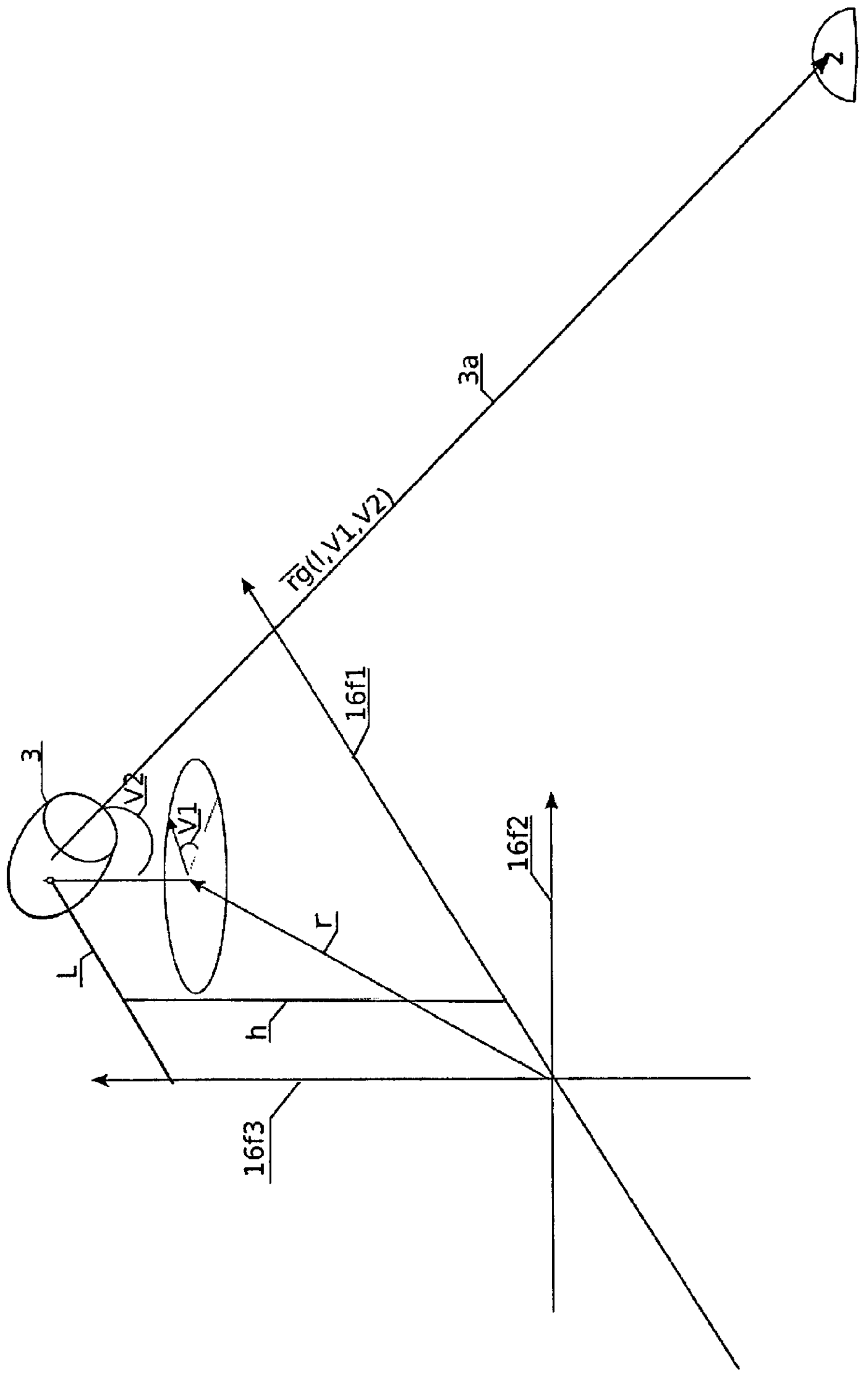

FIG. 6*a* illustrates the relationship between said searchlights (3) coordinate system placed into said vessels (1) coordinate system, and the relationship between these coordinate systems and a point (2*p*) of an object (2) on the surface of the sea.

Figure 6B:
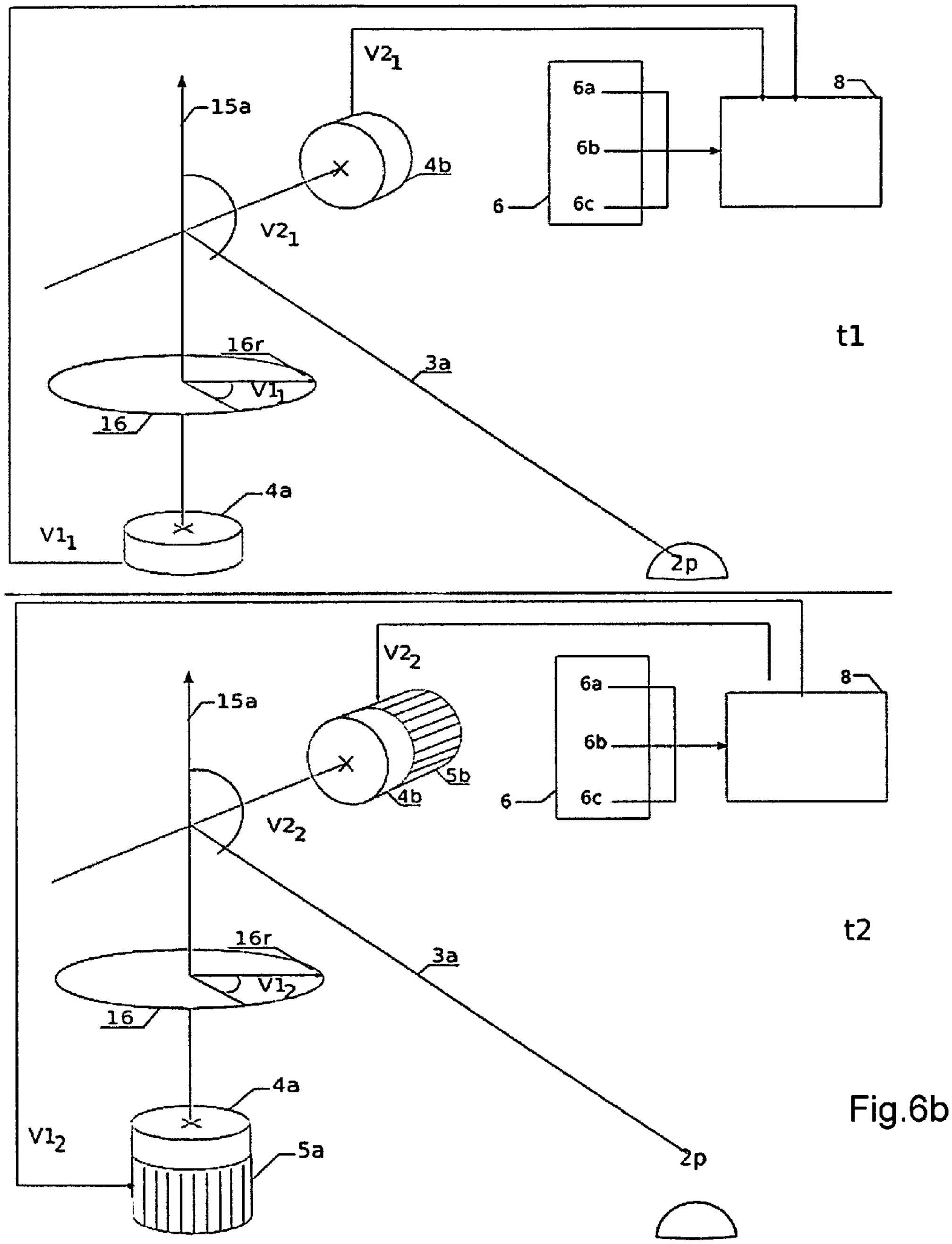

FIG. 6B illustrates measurement of the angles of said beam axis (3*a*) in said searchlights (3) coordinate system at a first instance (t1) and coincidental measurement of yaw, roll and pitch angles. Said figure shows the same measurement of yaw, roll and pitch angles at a second instance (t2) when said vessel (1) has moved, which results in a computation of new beam axis (3*a*) angles, so that said beam axis (3*a*) shall point towards said same point (2*p*).

Figure 7:
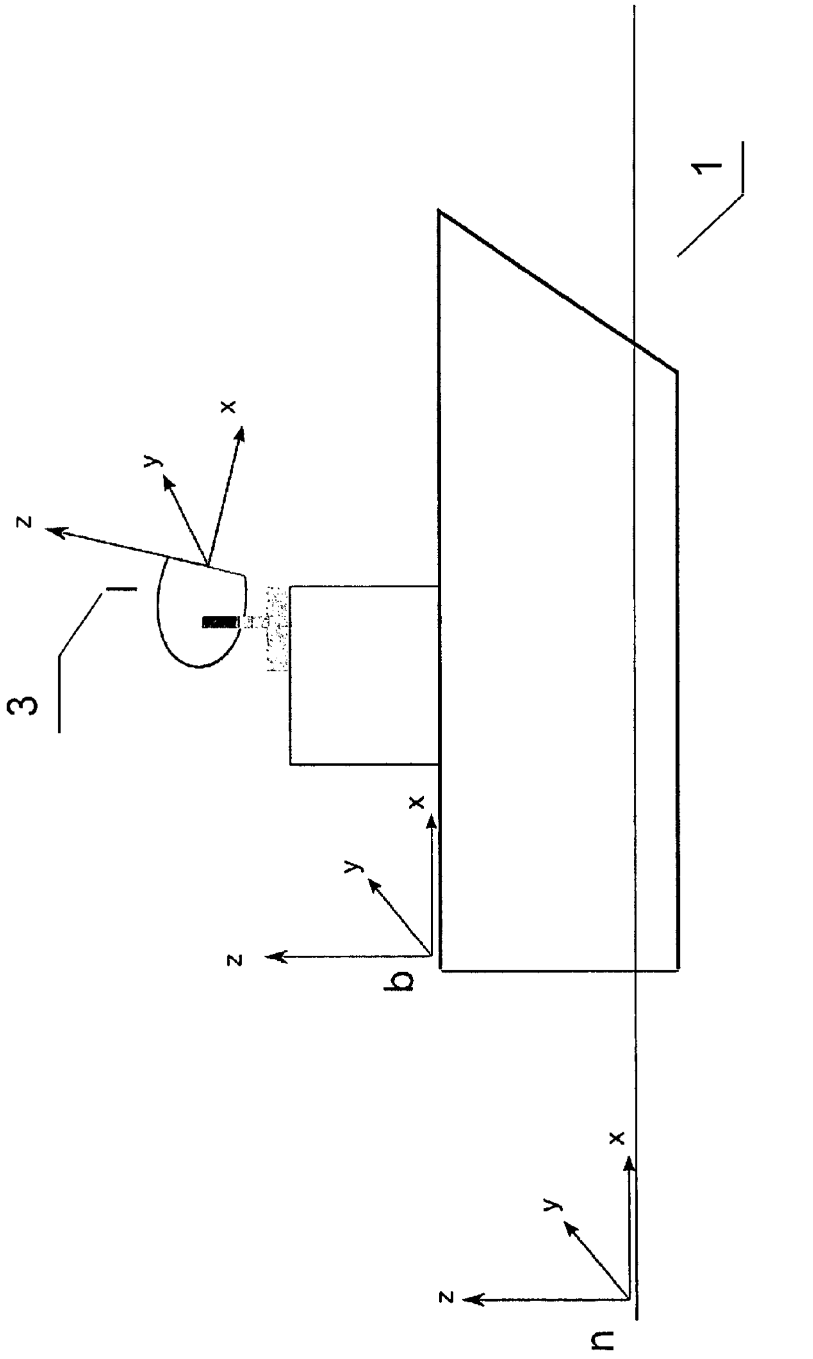

FIG. 7 illustrates said searchlights' (3) coordinate system called l-system, said vessels (1) coordinate system called b-system, and a geographic coordinate system called n-system which is a fixed static system with respect to the Earth.

FIG. 8 shows schematically a plan view and side view of a vessel (1) with a searchlight (3) according to the invention directed towards a position (2*p*) in which said vessel (1) has moved with respect to said position (2*p*) while said searchlights' (3) beam axis (3*a*) still intersects with the sea surface in the same position (2*p*).

FIG. 9_1 illustrates a vessel (1) in movement along a route wherein it is expected to pass fixed points which are desirable to illuminate en route. This may be points on land such as sea marks or pier ends, or points in the sea such as sea marks, spars, buoys, reefs or the like.

FIG. 9_2 shows said vessel (1) en route in which it has arrived closer than a predefined distance $r_1$ from a first point (2$p_1$) which is to be illuminated.

FIG. 9_3 shows said vessel (1) in its continued movement in which it has passed said point (2$p_1$) and arrived closer than a second predefined distance $r_2$ from a following point (2$p_2$) which is desired illuminated.

FIG. 10_1 shows a selection of possible search patterns (19) to be formed by said beam axis (3*a*) intersection with the sea surface.

FIG. 10_2 shows the same selection of search pattern (19) to be formed by said beam axis (3*a*) intersection with the sea surface, in which said search patterns (19) are bounded by outer points in the shape of geographic positions which may be operator defined or pre-stored, or which may be received from an operational leader.

FIG. 11_1 shows a searchlight (3) which is directed on repeated occasions towards an object, for computation of said objects drift direction and drift velocity.

FIG. 11_2 shows a vector diagram which describes the same situation as in FIG. 11_1.

FIG. 12_1 shows two separate searchlights (3, 3') on board a vessel (1) in which said searchlights (3) collaborate in a search in a desired search area.

FIG. 12_2 shows two separate searchlights (3, 3') on board respective vessels (1, 1'), in which said vessels (1, 1') with their respective searchlights (3, 3') collaborate in a search in a desired search area.

FIG. 12_3 shows the same situation as in FIG. 12_2, but with three vessels (1,1',1"), and three separate searchlights (3, 3', 3").

FIG. 13_1 shows an elevation view of said searchlight (3) according to the invention as a plan view.

FIG. 13_2 shows a front view of said searchlight according to the invention as a plan view.

FIGS. 14_1 and 14_2 shows possible placements of said engines (5) of said searchlight (3).

Figure 15:
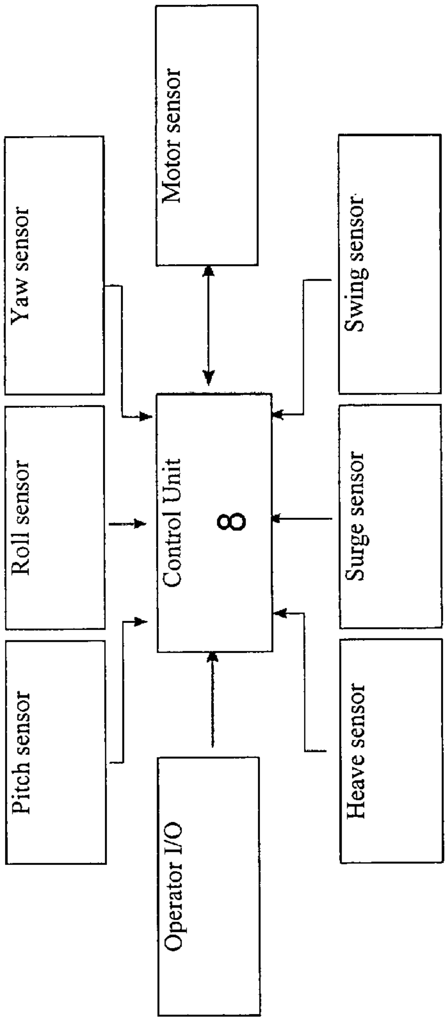

FIG. 15 shows a flow diagram in which said control unit (8) receives and furnishes signals to some of the elements which interact with said control unit (8).

Figure 16:
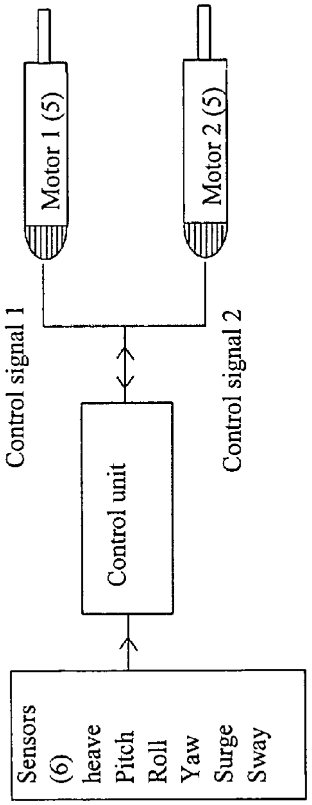

FIG. 16 likewise shows a control unit in interaction with sensors (6) and motors (5).

Figure 17:
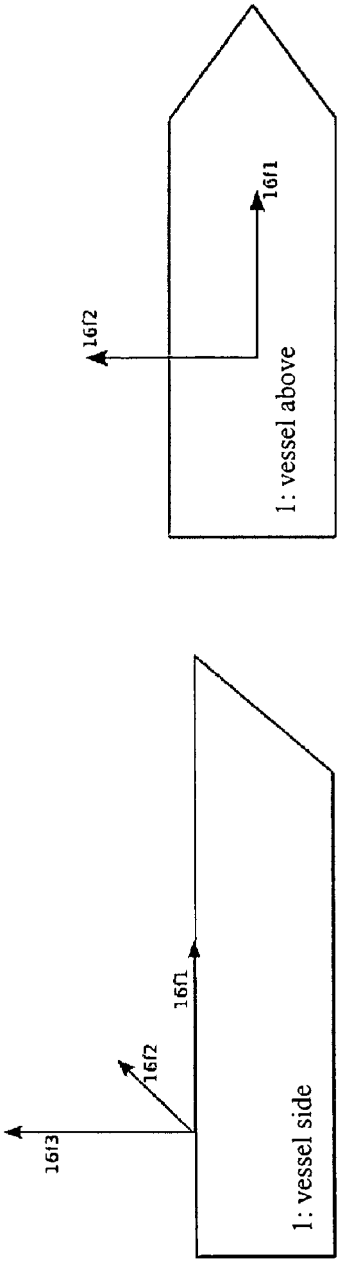

FIG. 17 shows said vessel (1) and a coordinate system which is allocated to said vessel (1).

Figure 18:
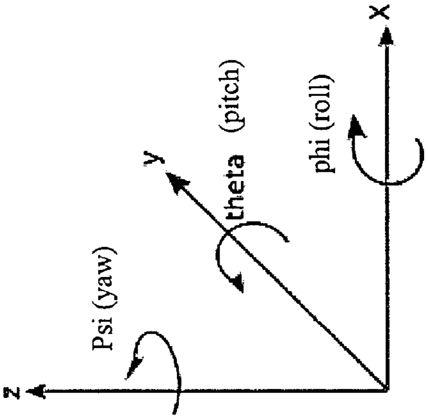

FIG. 18 shows the Euler angles which are used in the method for angle computation according to the invention.

Figure 19:
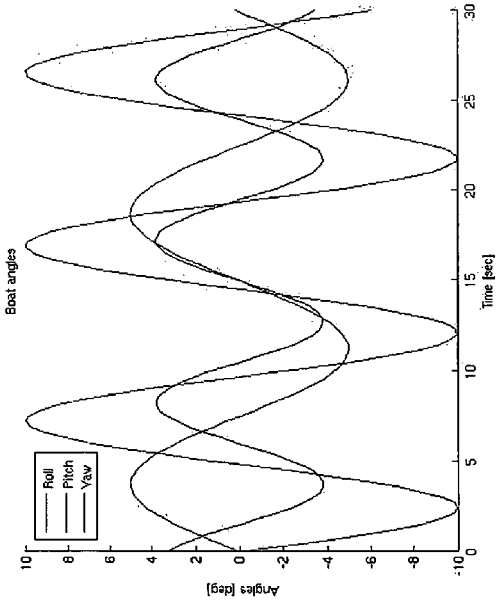

FIG. 19 is a diagram showing the movements of said vessel (1) in pitch, roll and yaw movement as used in calculation examples 1 and 2, which is valid for the German utility model and for the present invention.

Figure 20:
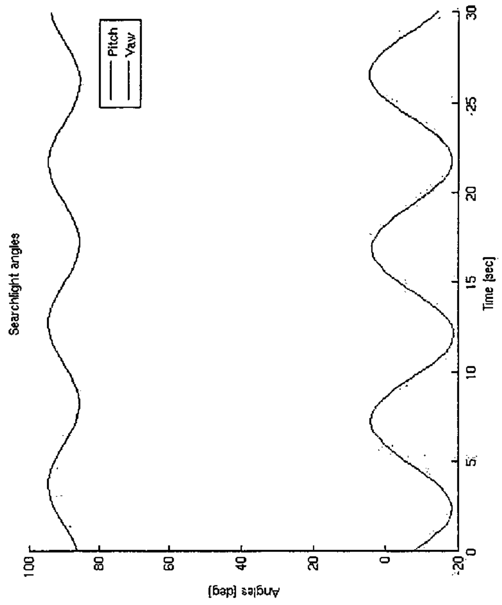

FIG. 20 is a diagram showing the angles (4*a*, 4*b*) of said beam axis as calculated with respect to calculation example 1 according to an embodiment of the present invention.

Figure 21:
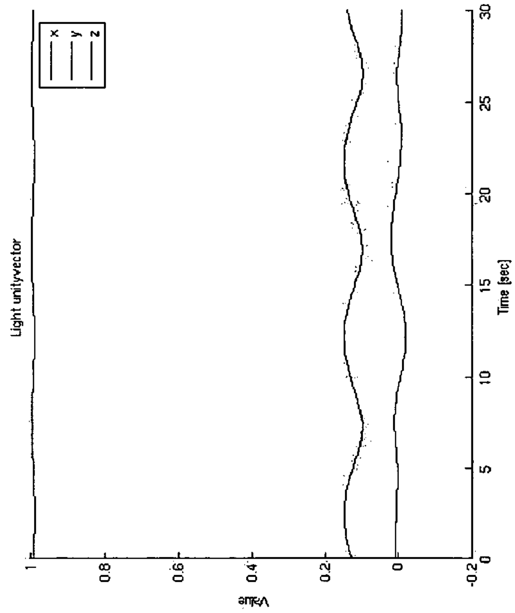

FIG. 21 shows the components of a vector in directions which are coincidental and parallel to said beam axis (3*a*), where the direction of said beam axis intersect with the water surface in said point (2*p*) as calculated with respect to calculation example 1 according to an embodiment of the present invention.

Figure 22:
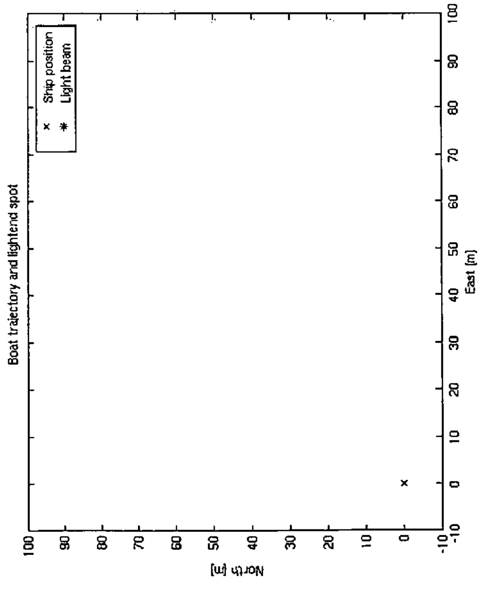

FIG. 22 show said vessels (1) position, given by a cross, and a series of computations of the resulting illuminated point where said beam axis (3*a*) intersects the water surface as calculated with respect to computation example 1 according to an embodiment of the present invention. Note that these points are identical to point (2*p*), and that all said points overlap.

Figure 23:
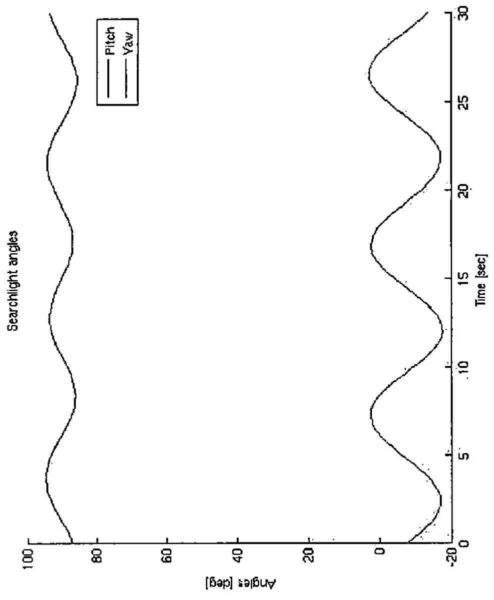

FIG. 23 is a diagram showing said beam axis angles (4*a*, 4*b*) as calculated with respect to calculation example 1 according to DE 20207444.

Figure 24:
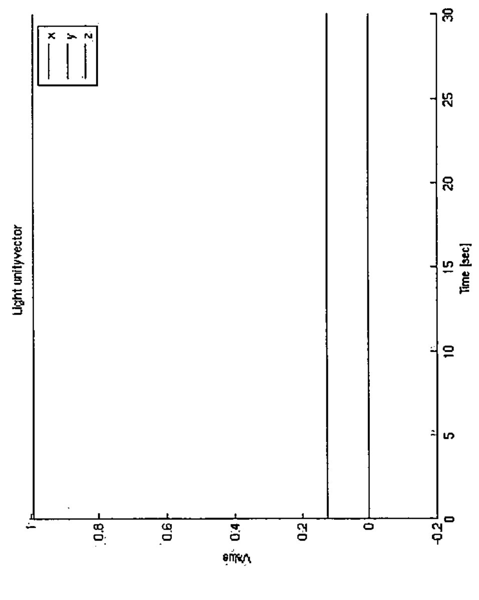

FIG. 24 shows a vector coincidental with and parallel to said beam axis (3*a*), in which its direction intersects with the water surface in a series of points as calculated with respect to computation example 1 according to DE 20207444.

Figure 25:
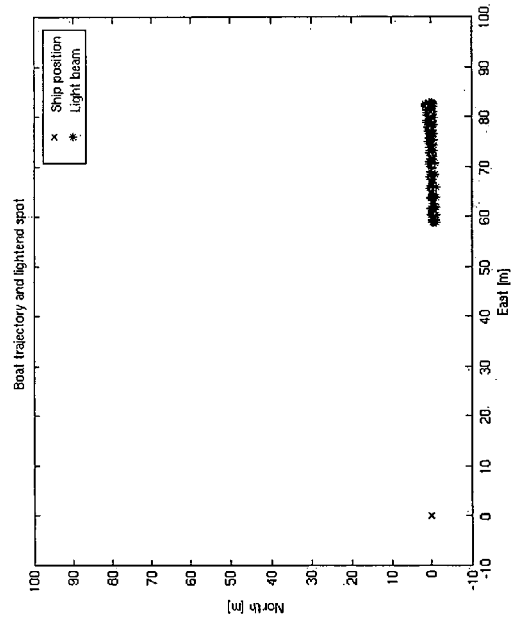

FIG. 25 shows said vessels (1) position given by crosses and the point where said beam axis (3*a*) intersects with the water surface as calculated with respect to computation example 1 according to DE 20207444.

Figure 26:
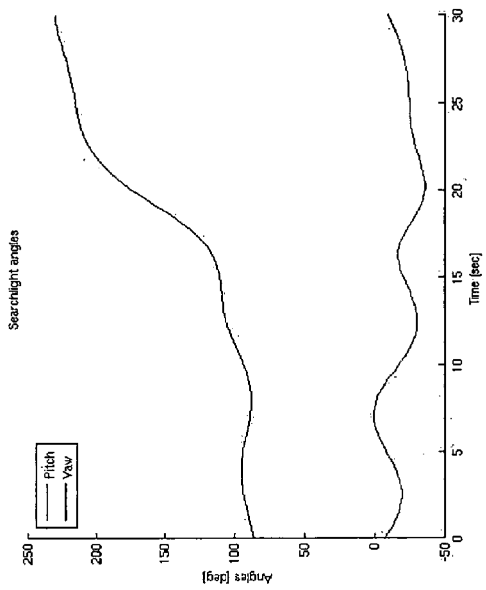

FIG. 26 shows the angles (4*a*, 4*b*) of said beam axis as calculated with respect to calculation example 2 according to an embodiment of the present invention.

Figure 27:
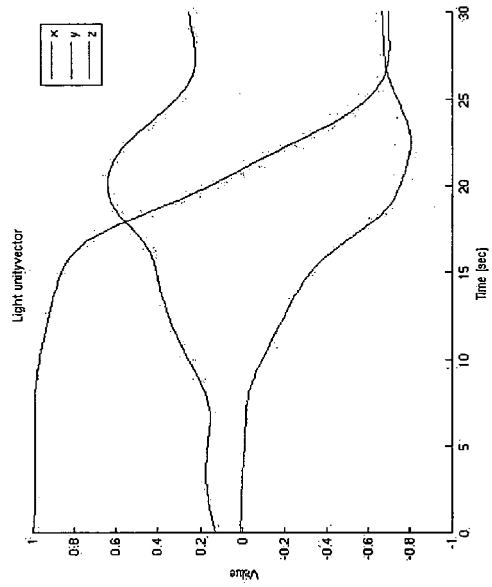

FIG. 27 shows a vector coincidental with and parallel to said beam axis (3*a*), in which its direction intersects with the water surface in the point (2*p*) as calculated with respect to computation example 2 according to an embodiment of the present invention.

Figure 28:
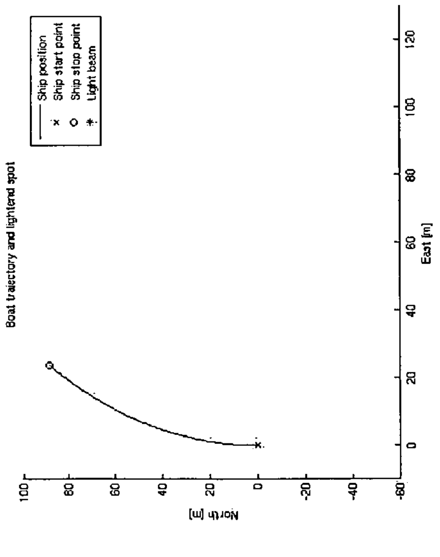

FIG. 28 shows said vessels (1) position given by crosses and the point where said beam axis (3*a*) intersects with the water surface as calculated with respect to computation example 2 according to the present invention. Note that all these points are identical with said point (2*p*) and that all said points overlap.

Figure 29:
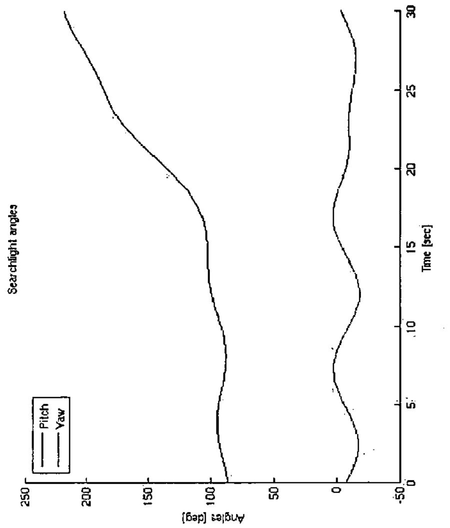

FIG. 29 shows the angles (4*a*, 4*b*) of said beam axis as calculated with respect to calculation example 2 according to DE 20207444.

Figure 30:
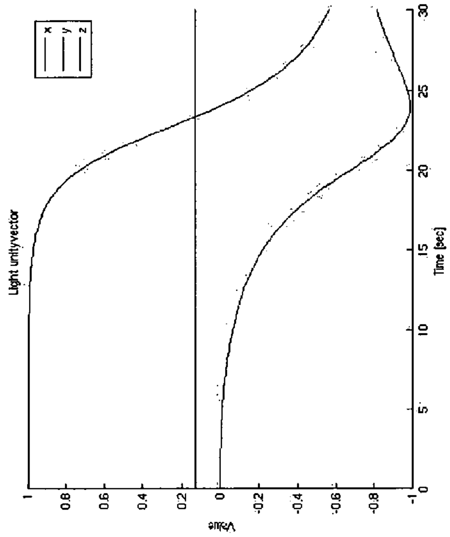

FIG. 30 shows a vector coincidental with and parallel to said beam axis (3*a*), in which its direction intersects with the water surface in a series of points as calculated with respect to computation example 2 according to DE 20207444.

Figure 31:
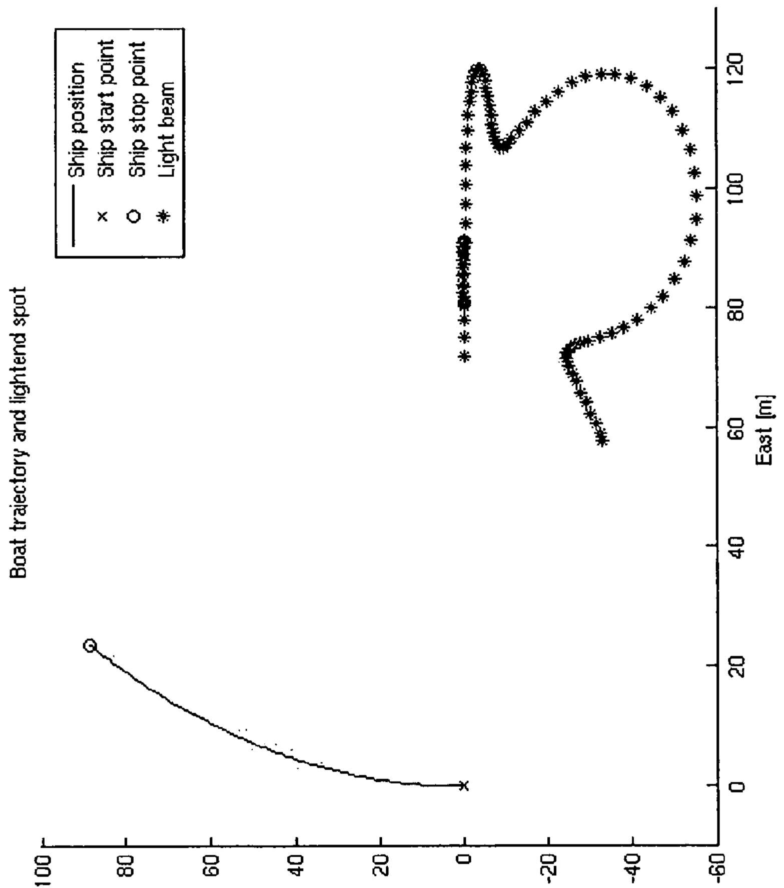

FIG. 31 shows said vessels (1) position given by crosses and the point where said beam axis (3*a*) intersects with the water surface as calculated with respect to computation example 2 according to DE 20207444. It is evident that the point is not kept in a correct position when said vessel is moving and heaving, and amongst others, this is not taken into account in the German utility model.

DESCRIPTION OF PREFERRED EMBODIMENTS OF THE INVENTION

Figure 0:
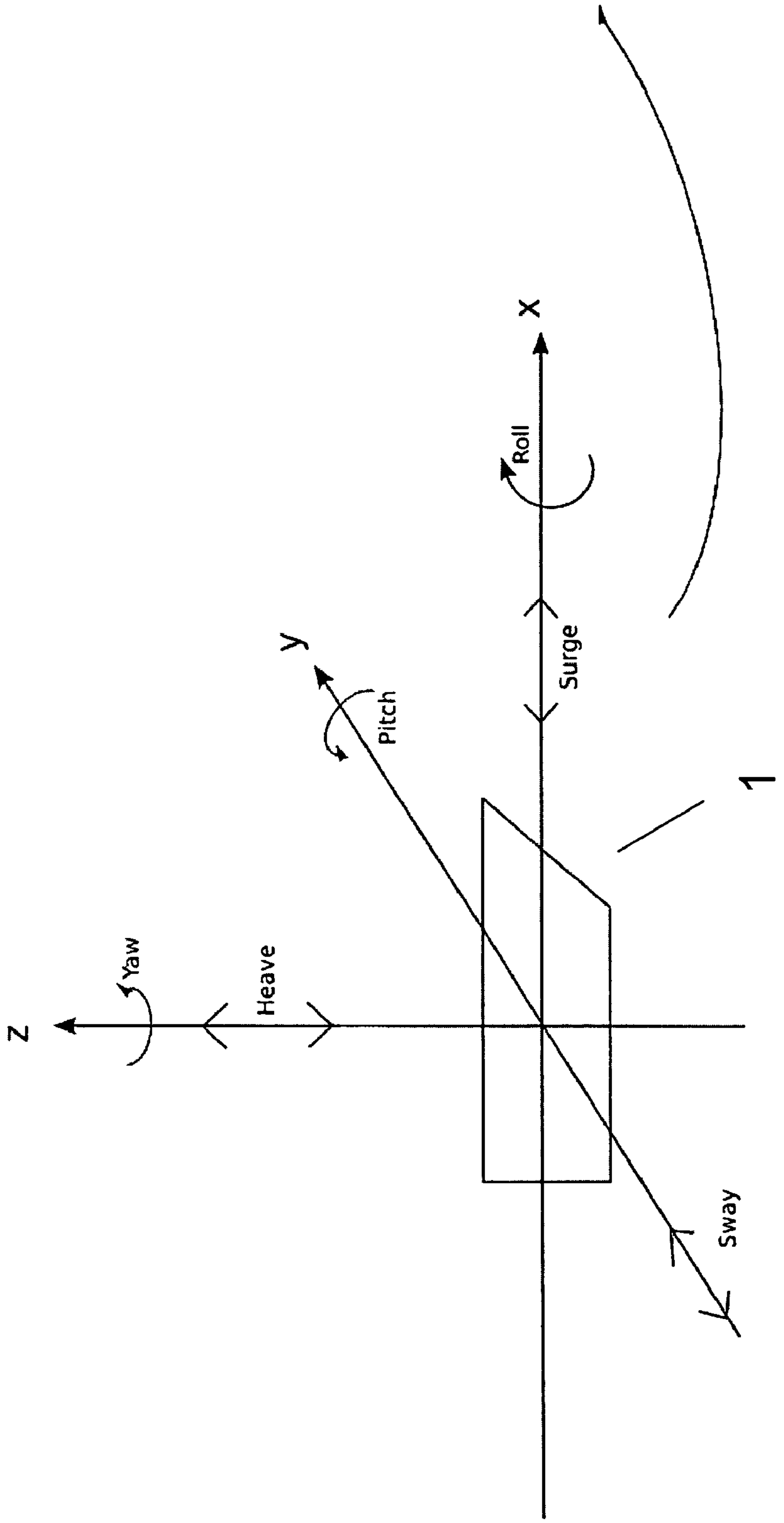
FIG. 0 shows a vessels (1) coordinate system, and said vessels (1) rotational movements roll (about the length axis), pitch (about the transversal axis) and yaw (about the vertical axis), as well as the translatory movements surge (alongst the length axis), sway (alongst the transversal axis) and heave (alongst the vertical axis).
Figure 1:
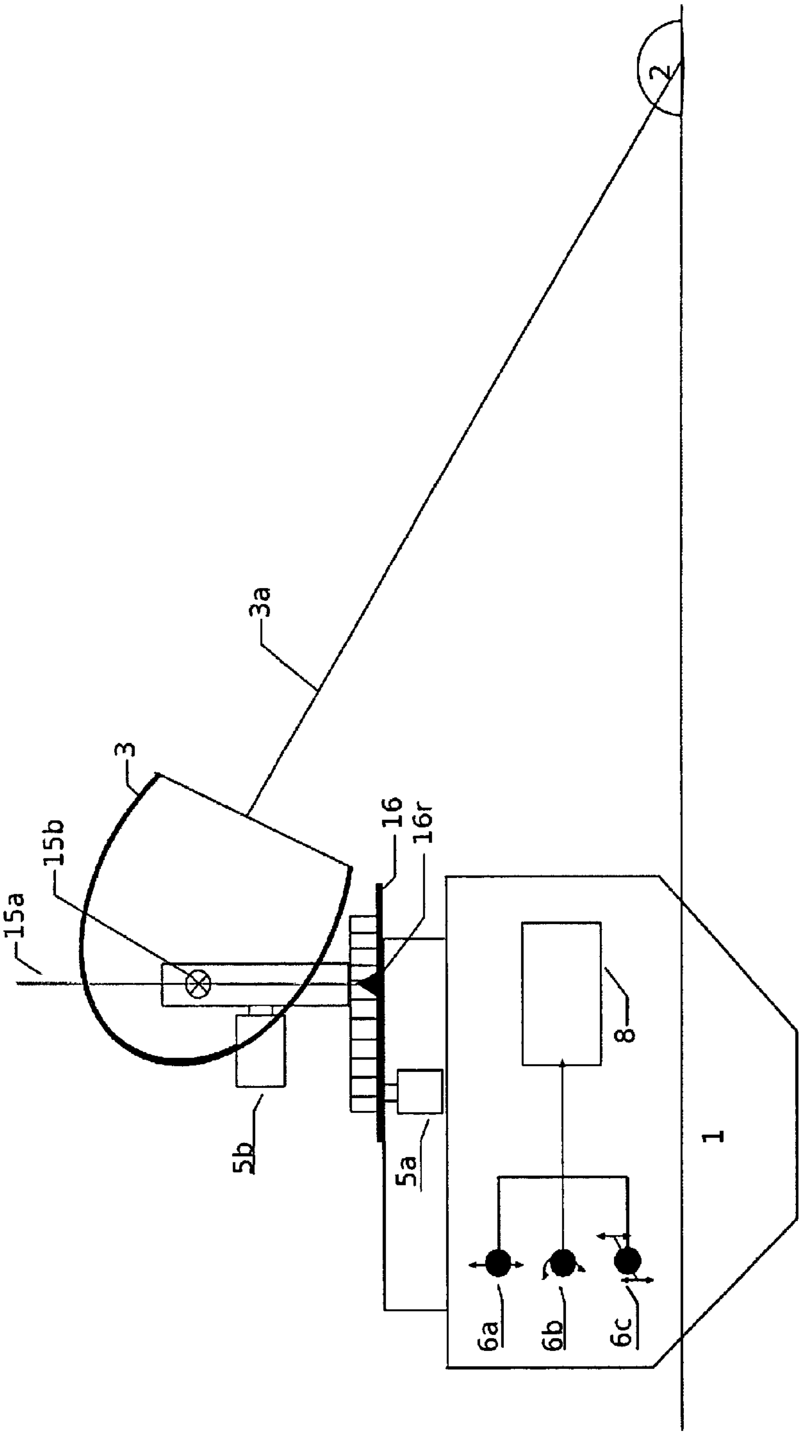
FIG. 1 shows a vessel (1) on an even keel in calm seas, with a rotating and tiltable searchlight (3) mounted on a platform with a base plane which is fixed with respect to said vessel, and a person or object (2) towards which a beam axis (3*a*) from said searchlight (3) is directed.

Said searchlight (3) according to an embodiment of the invention has a set-up as shown in FIGS. 13_1 and 13_2 which show elevation views and front views of a preferred embodiment of the invention. For a more detailed description of said searchlight (3) in use, reference is made to FIGS. 1 and 2 in which said searchlight (3) is shown arranged in a mounting or rack on board a vessel (1) having a height (h1) above the sea. Said searchlight (3) has a beam axis (3*a*), in which said beam axis (3*a*) is arranged for illuminating a point or an object (2*p*) on the surface of the sea or possibly on land.

Said searchlight (3) has two degrees of freedom with respect to said vessel (1) on which it is arranged, which are mechanically controlled and are used for controlled rotation around a perpendicular axis (15*a*), in which said perpendicular axis (15*a*) is oriented perpendicularly on a base plane (16), and in which said searchlight (3) is further arranged for controlled rotation about an axis (15*b*) is parallel to said base plane (16). At least one reference direction (16*r*) is defined on said base plane (16), which is used as a fixed reference direction both during the initialising of said searchlight (3) and said searchlights (3) orientation, and for correction of errors in said beam axis' (3*a*) computed position, where such errors may arise over time.

The beam from said searchlight (3) defines said beam axis (3*a*), and said searchlight (3) is furnished with at least a first engine (5*a*) for movement of said searchlight (3), and thus said beam axis (3*a*), about said perpendicular axis (15*a*), and at least a second motor (5*b*) for movement of said light axis (3*a*) about said base plan parallel axis (15*b*), see FIGS. 14_1 and 14_2 for illustration of the possible placement and set-up of said motors (5). Said motors (5) rotate said beam axis (3*a*) about said perpendicular axis (15*a*) and said base plane parallel axis (15*b*) and directs said beam axis (3*a*) towards the movable or fixed point (2*p*) on the surface of the sea (3). Said motors (5) may be for instance DC-motors in which necessary integrated hardware drivers are used as shown in FIGS. 14_1 and 14_2.

Said searchlight (3) according to the invention may further comprise a control unit (8) arranged for receiving sensor signals (17) from the following:

- a first heading sensor (4*a*) for measurement of the angle (v1) of said beam axis (3*a*) projected down onto said base plane (16) with respect to said reference direction (16*r*);
- a second heading sensor (4*b*) for measurement of the angle (v2) of said beam axis (3*a*) with respect to said perpendicular axis (15*a*);
- vessel movement sensors (6) for measurement of said vessels (1) rotation angles, at least one or more of a yaw sensor (6*d*), a roll sensor (6*b*) or a pitch sensor (6*c*);
- vessel movement sensors (6) for measurement of said vessels (1) translatory movements, at least one or more of a surge sensor (6*e*), a heave sensor (6*a*), or a swing sensor also called a sway sensor (6*f;*
- a positional sensor, for instance a GPS-receiver (7) which calculates geographical latitude (7*a*) and longitude (7*b*) in a global coordinate system.

FIG. 15 illustrates a possible schematic set-up of said control unit (8) and the ancillary sensors (6; 6*a*, . . . , 6*f,* motors (5; 5*a*, 5*b*) and control signals.

Said control unit (8) is arranged for acquiring and treating sensor values from desired sensors (6). Said control unit performs mathematical calculations on the basis of said acquired sensor values and the results are used to control said motors (5*a*, 5*b*) so that said beam axis (3*a*) is directed towards a desired movable or fixed point (2*p*) on the surface of the sea. Said control unit (8) may in an embodiment comprise a microcontroller with sufficient speed and the possibility for floating-point number operations, PWM, 8- and 16 bit counters, serial and parallel buses and internal and external interrupts which cooperate with the accompanying components to these, sensors (6) and motors (5), by using components like electrical supply and switch boxes.

Said heading sensors (4*a*, 4*b*) for measurement of the angles (v1, v2) of said beam axis (3*a*) may by title of example use cooperating so called encoders, absolute or relative, which furnish a number of pulses during a rotation, in which the number of pulses is given by the resolution of the encoders, or a rotary potentiometer, which is a variable resistance, where the resistances' value changes according to in which degree said rotary potentiometer is rotated. The data from either said encoder, potentiometer, or other kind of angle sensor is processed by said control unit (8), and indicates the absolute value of said angles (v1, v2). Said vessel movement sensor (6) for measurement of said vessels (1) yaw angle may as an example be implemented by means of a magneto-resistive sensor which functions as an analogue compass and which uses the earths varying magnetic field to indicate said sensors orientation with respect to the geomagnetic field. In a preferred embodiment of the invention, said vessel movement sensors (6) for measurement of said vessels (1) roll and pitch movement may e.g. be a two axis tilt sensor? which uses a chamber with conductive fluid and five capacitive conductive poles, and indicates an absolute angle in pitch and roll with respect to said horizontal plane.

Said vessel movement sensors (6) for measurement of said vessels (1) translatory movements, that is to say heave, surge and swing movements, may in one embodiment comprise a three axis accelerometer which furnishes an acceleration measurement along the three axes of the Cartesian coordinate system, x-axis, y-axis, z-axis. By double integrating each of said axis measurements one may through mathematical relations achieve a qualitative value of movement in surge, swing and heave. Furthermore the measurements from a GPS-receiver may be used to indicate the movement in surge and swing as these can be considered to be an alteration in global 2-dimensional position. Said GPS-receiver will for instance with a frequency of 1 hz furnish a value for global position and by considering the change from the last position reference, the difference will indicate a movement.

Said control unit (8) is further arranged for, on the basis of said sensor signals (17) which it receives to calculate and furnish control signals (9) to said motors (5*a*, 5*b*) for rotation of said beam axis (3*a*) about said perpendicular axis (15*a*) and said base plane parallel axis (15*b*), so that said beam axis (3*a*) is kept towards a desired point (2*p*) on sea when said vessel (1) moves.

Said control unit (8) is arranged for using the information from said sensors (6) concerning said vessels (1) spatial position and said beam axis (3*a*) orientation to calculate and furnish a first control signal (9*v*1) to said first motor (5*a*) for rotation of said beam axis (3*a*) about said perpendicular axis (15*a*), and to calculate and furnish a second control signal (9*v*2) to said second motor (5*b*) for rotation of said beam axis (3*a*) about said base plane parallel axis (15*b*), see FIG. 16.

According to a preferred embodiment of the invention, said base plane (16) is stationary with respect to said vessel (1) and is parallel with the plane which is spanned by said vessels (1) longitudinal axis (**16*f*1) and said vessels (1) transversal axis (16*f*2), in which the perpendicular axis (15***a*) of said base planes (16) is parallel to said vessels vertical axis (**16*f*3). Said vessels (1) longitudinal axis (16*f*1) and transversal axis (16*f*2) are horizontal at said vessels (1) neutral stationary position, and said vertical axis (16*f*3) stands perpendicularly on the plane spanned by said vessels (1) longitudinal axis (161*f*) and said vessels (1) transversal axis (16*f*2), see FIG. 17. Said vessels (1) axes (16*f*1, 16*f*2, 16*f*3) and thus also said base plane (16) rotate with said vessels (1) rotational movements, see FIG. 17**.

Furthermore, said control unit (8), according to a preferred embodiment of the invention, is arranged for receiving measurements from a first heading sensor (4*a*) for measurement of said transversal axis' (3*a*) angle ($v1_1$) projected down onto said base plane (16) with respect to said fixed reference direction (16*r*), when said beam axis (3*a*) at a first instance (t1) points towards a desired point (2*p*) on the sea.

Said searchlight (3) further comprises a second heading sensor (4*b*) for measurement of the angle ($v2_1$) of said beam axis' (3*a*) with respect to said perpendicular axis (15*a*) when said beam axis (3*a*) at a first point in time (t1) points towards a desired point (2*p*) on the sea.

Said control unit (8) is at the same time arranged for receiving measurements from said vessel movement sensors (6) for measurement of said vessels (1) rotational angles, also known as the Euler angles, as said beam axis (3*a*) at a first instance (t1) points towards a desired movable or fixed point (2*p*) on the sea surface. The Euler angles describes the rotation about the directions of the three axis given by the Cartesian coordinate system, in which rotation about the x-axis, roll, is given by the angle phi (ϕ), rotation about the y-axis, pitch (pitch), is given by the angle theta (θ), and rotation about the z-axis, yaw, is given as the angle psi (Ψ). The Euler angles are illustrated in FIG. 18.

Said control unit (8) will in a particularly preferred embodiment have access to a memory for storage of said angles ($v1_1$), ($v2_1$) and said vessels rotational angles at the instance (t1). By means of these angles and the height of said searchlight (3) above the sea surface, an unambiguous movable or fixed point (2*p*) is defined onto which said beam axis (3*a*) is desired to be locked. Said control unit (8) uses said angles stored in said memory to construct two rotational matrixes, $R^n_b$ and $R^b_l$ on the basis of said angles measured at the initial instance (t1). $R^n_b$ and $R^b_l$ are 3×3 matrixes that contain sine and cosine functions to said Euler angles at relevant points in time, in which the inserted Euler angles are the angles of respectively said b-coordinate system and n-coordinate system in $R^n_b$, and the l- and b coordinate systems (in $R^b_l$). The various coordinate systems are sketched in FIG. 7. Below is shown the general formula for an arbitrary rotational matrix R.

$$R = \begin{bmatrix} \cos(\psi)\cos(\theta) & -\sin(\psi)\cos(\varphi) + \cos(\psi)\sin(\theta)\sin(\varphi) & \sin(\psi)\sin(\varphi) + \cos(\psi)\cos(\varphi)\sin \\ \sin(\psi)\cos(\theta) & \cos(\psi)\cos(\theta) + \sin(\varphi)\sin(\theta)\sin(\psi) & -\cos(\psi)\sin(\varphi) + \sin(\theta)\sin(\varphi)\sin \\ -\sin(\theta) & \cos(\theta)\sin(\varphi) & \cos(\theta)\sin(\varphi) \end{bmatrix}$$

$R^n{}_b$ is the rotational matrix from said vessels (1) coordinate system, b-system, and the earthly coordinate system, n system, said n-system at the initial instance (t1), and contains the angles measured by said vessel movement sensors (6) inserted into the various sine and cosine functions as shown in the above expression for R. $R^b{}_l$ is the rotational matrix from said searchlights (3) coordinate system, l-system, and said vessels (1) coordinate system, b-system, and contains the various sine and cosine functions as inserted into the above expression for R. Said l coordinate system is fixed with respect to said searchlight (3), in which the x-axis of said l-coordinates system coincides with said beam axis (3*a*), and in which the z-axis of said l-coordinate system stands perpendicularly on the x-axis of said l-coordinate system. Said b-coordinate system is fixed with respect to said vessel (1) in which the x-axis of said b-coordinate system coincides with said vessels (1) longitudinal axis (16/1), in which the y-axis of said b-coordinate system coincides with said vessels (1) transversal axis (16/2) and in which the z-axis of said b-coordinate system coincides with said vessels (1) perpendicular axis (16/3). Said n-coordinate system is fixed with respect to Earth, in a preferred embodiment fixed with respect to the Earths surface with x-axis parallel to the x-axis of said b-system projected down onto the Earth plane, and y-axis parallel to the y-axis of said b-system projected down onto the Earth plane, which altogether span out the Earths local horizontal plane, and z-axis which stands perpendicularly onto this plane, see FIG. 7.

From $R^n{}_b$ and $R^b{}_l$ is derived a fixed rotational matrix $R^l{}_n$, which describes the orientation between said l-system and said n-system.

$$R^l{}_n = (R^n{}_b R^b{}_l)^T$$

This forms at the initial instance (t1) a vector referred to said n-system overlying said beam axis (3*a*) and which points towards said movable or fixed point (2*p*). Said vector also indicates the distance from said vessels (1) axis-centre to the movable or fixed point (2*p*). Said rotational matrix $R^l{}_n$ is kept unchanged by said control system (8) as long as said beam axis (3*a*) is intended to point at said movable or fixed point (2*p*) given at the initial instance (t1).

According to a preferred embodiment of the invention, said control system (8) acquires measurements from said vessel movement sensors (6) for measurement of said vessels (1) rotational angles at a second instance (t2). Said angles from said vessel movement sensors (6) are the utilised to derive a new rotational matrix $R^n{}_b$ which gives said b-systems orientation at a second instance (t2) referred to said fixed n-system. To compensate for said searchlight (3) not being arranged in said vessels (1) axis-centre, a correctional term is introduced which with a basis in said vector describes the placement of said searchlights (3) base plane (16) with respect to the boats axis centre, also called vector $r^b{}_l$, see FIG. 6*a*. $r^b{}_l$ vector is rotated with said rotational matrix $R^n{}_b$ to constitute the vector $p^n{}_l$ which describes said searchlights (3) placement with respect to said fixed n-coordinate system at a second instance (t2).

$$p^n{}_l = R^n{}_b r^b{}_l$$

Furthermore the position of said point (2*p*) in the water is utilised to compute changes in the angles phi(ϕ) and psi(Ψ) due to said searchlights (3) placement on board said vessel (1) and said vessels' (1) movements. The calculation is shown below, in which v is a directional vector to said point (2*p*), s is the free variable in a parameterization of the line between said searchlight (3) and said point (2*p*). $p^n{}_w$ is the position vector for said point (2*p*), c is a direction vector ? between said point (2*p*) and said vessel (3) after a change in position, and r is the scalar length of the vector c. $Phi_{ny}$(ϕ) is the new phi(ϕ) due to said searchlights (3) placement from said vessels (3) axis centre and $psi_{ny}$(Ψ) the new psi(Ψ) due to said searchlights (3) movement in space due with respect to said searchlights (3) placement from said vessels (3) axis-centre and said vessels (1) movement.

$$v = \begin{bmatrix} x \\ y \\ z \end{bmatrix} = \begin{bmatrix} \cos(\psi)\sin\left(\frac{\pi}{2} - \Box\right) \\ \sin(\psi)\sin\left(\frac{\pi}{2} - \Box\right) \\ \cos\left(\frac{\pi}{2} - \Box\right) \end{bmatrix}$$

$$s = -\left[\frac{n \cdot r_l^b}{n \cdot v}\right]$$

$$p_w^n = r_l^b + sv$$

$$c = p_w^n - p_l^n$$

$$r = \sqrt{x^2 + y^2 + z^2}$$

$$\Box_{ny} = -\frac{\pi}{2} + a\cos\left(\frac{z}{r}\right)$$

$$\psi_{ny} = a\tan 2\left(\frac{y}{x}\right)$$

Said rotational matrix $R^n{}_b$ is updated with these new correctional terms. From this corrected rotational matrix $R^n{}_b$, given at said second instance (t2), and the fixed rotational matrix $R^l{}_n$ given at the first instance (t1), is derived a new rotational matrix $R^b{}_l$ which describes the relationship between said vessels (1) b-coordinate system and said searchlights (3) l-coordinate system at a second instance (t2).

$$R^b{}_b = (R^n{}_b)^T (R^l{}_n)^T$$

From this formula the new angles ($v1_2$, $v2_2$) may be derived, as they indicate how said beam axis (3*a*) must be oriented in order for it to continue to point towards said movable or fixed point (2*p*) at a second instance (2*p*).

Furthermore, said control unit (8) acquires measurements of said vessels heave position on the basis of a heave sensor (6*a*) at an initial instance (t1) when said beam axis (3*a*) points towards said movable or fixed point (2*p*). In a preferred embodiment of the invention, said control unit (8) comprises or has access to a memory in which said heave position at a initial instance (t1) is stored. At a second instance (t2) said control unit acquires said vessels heave position on the basis of a heave sensor (6*a*). The difference between said stored heave position computed at the initial instance (t1) and said new heave position at the second instance (t2), indicates by trigonometric relations how the angle ($v2_1$) of said beam axis (3*a*) with respect to said perpendicular axis (15*a*) must be changed to said angle ($v2_2$) in order for said beam axis (3*a*) to continue to point towards said movable or fixed point (2*p*) at a second instance (t2).

According to a preferred embodiment according to the invention said control unit (8) acquires measurements of said vessels (1) geographic position on the basis of a sensor for said vessels (1) position (7), for instance a GPS-sensor (7*a*), accelerometer (7*b*) or radar (7*c*) at an initial instance (t1) when said beam axis (3*a*) points towards said movable or fixed point (2*p*). According to a preferred embodiment of the invention, said control unit (8) comprises, or has access to a memory, in which said geographical position is at an initial instance (t1) is stored. At the second instance (t2) said control unit (8) acquires the geographic position of said vessels (1) from said sensor for said vessels (1) position. The difference between the stored geographical position acquired at the initial instance (t1) and the new geographic position at a second instance (t2) indicates through trigonometric relationship how said the angle ($v1_1$) of said beam axis (3$a$) with respect to said fixed reference direction (16$r$) must change to said angle ($v1_2$) and how said angle ($v2_1$) with respect to said perpendicular axis (15$a$) must change to said angle ($v2_2$) in order for said beam axis (3$a$) to continue to point towards said movable or fixed point (2$p$) at a second instance (t2). This is illustrated in the equation below, see also FIG. 8.

$$V1_2 = \arctan\left(\frac{(\Delta y)}{l}\right) V2_2 = \arctan\left(\frac{(\Delta x)}{l}\right)$$

Said searchlight (3) according to the invention does not on the outset maintain said beam axis (3$a$) directed towards the object or person (2) in the sea if this floats off, but directed towards said geographical point (2$p$) in the sea towards which one has chosen to lock said beam axis (3$a$). Note that said geographical point (2$p$) may be fixed or movable according to a pattern. Said searchlight (3) will continue to illuminate said point (2$p$) regardless of whether said vessel (1) moves with respect to said point (2$p$) regardless of whether said vessel moves or not. According to this first simple embodiment of the invention an operator must therefore steer said searchlight (3) to follow said object if it should drift off.

In a particularly preferred embodiment of the invention, said vessel (1) is a ship, a platform, a buoy, a manned or unmanned marine vessel. In a further particularly preferred embodiment according to the invention, said vessel (1) is a helicopter, see FIG. 4. In a further preferred embodiment according to the invention a camera (18) is mounted on or by said searchlight, in which said camera is arranged for wholly or partly continuous recording (18$a$) of images (18$b$), see FIG. 5.), and in which the beam axis (18$a$) of said camera (18) is mainly parallel to said beam axis (3$a$) of said searchlight (3).

Description of a Search Method According to the Invention.

In a preferred embodiment of a search method according to the invention, in which said method comprises use of a searchlight (3) with a beam axis (3$a$) on a vessel (1), said method comprising the following steps:

- computation in a control unit (8) of the angle (v1) of said beam axis (3$a$) projected down onto a base plane (16) with respect to a reference direction (16$r$) by means of a first heading sensor (4$a$), in which said base plane (16) is fixed with respect to said vessel (1) and preferably parallel to the plane which is formed by said vessels' (1) longitudinal axis (16$f$1) and transversal axis (16$f$2), and in which said perpendicular axis (16$f$3) is vertical at said vessels (1) neutral stationary position, and rotates with said vessels (1) rotational movements.
- computation in said control unit (8) of the angle (v2) of said beam axis (3$a$) with respect to a perpendicular axis (15$a$) to said base plane (16) by means of a second heading sensor (4$b$),
- registration of said vessels (1) rotational and translatory movements by means of vessel movement sensor (6),
- registration of said vessels (1) geographic position in a coordinate system by means of a position sensor (7) for instance a GPS-receiver (7$a$), computation in said control unit (8) of control signals (9) to motors (5$a$, 5$b$) for rotation of said beam axis (3$a$) about said perpendicular axis (15$a$) and said base plane parallel axis (15$b$), so that the movements of said vessel (1) are compensated for, so that said beam axis (3$a$) is kept towards a desired point (2$p$) when said vessel (1) moves.

According to a further preferred method according to the invention, the method will comprise illumination of stored or fed positions. During transit in order to ensure said vessels (1) and the crews' safety, it may be desirable to illuminate and keep the focus onto known reefs buoys and/or landmarks which may be furnished automatically or manually by means of global coordinates. As said vessel (1) passes a first imagined line (POA1) with a first configurable distance r from a specific point or position (2$p$1), said control unit (8) will lock said beam axis (3$a$) on said point (2$p$1) on the basis of said vessels (1) heave position, instantaneous pitch, roll and yaw positions, global position, the angles of said beam axis (3$a$) angles with respect to the horizontal plane (v1) and the vertical plane (v2), as well as the height (h1) of said searchlight (3). Said beam axis (3$a$) will remain locked onto said point (2$p$1) either until it is passed, or until the operator interrupts the illumination, or until said vessel passes a second imagined point (POA2) in a second configurable distance r from a second point (2$p$2), and where as described above, said control unit (8) directs said beam axis (3$a$) towards said point (2$p$2) and remains locked towards said point (2$p$2) either until said point (2$p$2) is passed, or the operator interrupts said illumination, or until said vessel passes a further imagined line (POAn) in a next desired configurable distance r from a point (2$p$N). Thus according to the present invention, said searchlight (3) will also be able to function as a navigational aid in treacherous waters.

According to a further preferred embodiment according to the invention the method will comprise the performing of various search patterns (19) in which said beam axis (3$a$) defines search patterns (19) on the sea surface, and in which said search patterns are non-exhaustively illustrated with some examples in FIG. 10.

The method further comprises that said searchlight (3) independently of said vessels (1) position allows said control unit (8) to furnish control signals to said motors (5$a$, 5$b$), so that a desired sweep pattern then is performed, with a basis in the position of said beam axis (3$a$) at the time or direction or a configurable position and direction referred to said vessel (1). Said control unit (8) furnishes control signals to said motors (5$a$, 5$b$) by displacing an imagined point (2$p$) on the water surface in the shape of the desired pattern and performs said search patterns (19) within the given limits. Said control unit (8) is arranged for maintaining said beam axis (3$a$) on this movable or fixed point (2$p$), and according to the preferred embodiment said beam axis (3$a$) will follow said point and said searchlight (3) illuminate the area in a desired manner.

Said search patterns (19) according may be prestored and chosen by an operator (20) or recorded by an operator (20) according to need. Thus said operator (20) may perform a search sweep with a random pattern over an arbitrary area in extent and position referred to said vessel (1) or a global position through manual control of said searchlight (3). Underway said control unit will store the points (2$p$) which said beam axis (3$a$) illuminates in an internal or external memory. Said operator (20) may at a later instance perform said recorded sweep pattern, and said beam axis will pass those pre-recorded and stored points (2$p$) with respect to said vessel (1) or a global position. Said beam axis (3$a$) will follow the same path as said recorded pattern, and illuminate the area according to said operators wish.

The abovementioned search patterns (19) may be performed according to at least three manners:

- independently of geographic position, and said search patterns (19) will then only be limited by said searchlight's (3) mechanical limitations.
- independently of geographic position, but said operator may limit both said predefined and said recorded search patterns (19) by indicating limitations on the change in the horizontal angle (v1) and vertical angles (v2) of said beam axis (3*a*).
- depending on geographic position, in which both said predefined and said recorded search patterns (19), are performed limited by a geographical area in which position and direction is defined according to a geographical area limited by global coordinates, see FIG. 10_2.

According to a particularly preferred embodiment according to the invention, said method will comprise tracking of a point (2*p*) drifting in the water, see FIG. 11. Persons and objects which lie in the water are influenced by current, waves and wind, and will drift about. By taking into account the drift of said object or person one will be able to compensate for this, and maintain said beam axis (3*a*) locked onto said person or object even though it drifts in the water. The method will, in a preferred embodiment of the invention, possibly be performed in the following manner:

Said operator (20) directs said beam axis (3*a*) towards a desired object in a point (2*p*1) at an initial instance µl, and indicates that this point (2*p*1) is to be considered the first point. Said control unit (8) utilises said beam axis' (3*a*) horizontal angle (v1) and vertical angle (v2) and said searchlights (3) height over the sea at said first instance (t1) to calculate the direction and length of said beam axis with respect to said n-coordinate system, which is stored in a first vector (Va1) in a memory. At a second instance (t2) the same desired object, which now is situated at a second point (2*p*2), is illuminated again, and the operator indicates that this point (2*p*2) is to be considered as a second point. Said control unit (8) utilises said horizontal angle (v1) and said vertical angle (v2) of said beam axis' (3*a*), and the height of said searchlight (3) over the sea surface at said second instance (t2) to calculate the direction and length of said beam axis with respect to said n-coordinate system, which is stored in a second vector (Va2) in a memory. The difference between said first vector (Va1) and said second vector (Va2), called a differential vector dVa indicates the distance and position of said second point (2*p*2) with respect to said first point (2*p*1). The difference between said first instance (t1) and said second, called the time vector dt, indicates the distance in time between said first instance (t1) and said second instance (t2). By taking the absolute value of said differential vector dVa one obtains the length of said differential vector dVa. By dividing the absolute value of dVa with the time difference dt, one obtains a calculation of average velocity, v, which said object has described between the first instance (ti) and the second instance (t2), and in which the drift direction is given by said differential vector dVa. Said differential vector dVa is extended as an imagined vector vf with the same direction as said differential vector dVa and mathematical absolute value larger than nil and less than infinite. Said control unit (8) is arranged for furnishing control signals to said motors (5) for moving said beam axis (3*a*) at a third imagined instance (t3) along the imagined vector vf with a velocity equal to v, and said beam axis will retrieve the object which floats with a velocity equal to v in the direction given by said vector vf. If one performs this operation continuously after the first two steps, said searchlight (3) may during a certain time follow an object that drifts off.

In an alternative embodiment of the invention, the operator (20) directs said beam axis (3*a*) towards a desired object at a first point (2*p*1) at a first instance (t1), and indicates that said first point (2*p*1) is to be considered as the initial point. Said operator (20) then maintains said beam axis (3*a*) directed towards the same point on said object as at said instance (t1) while said object drifts in the water. Said control unit (8) continuously calculates the variations in the horizontal angle (v1) of said beam axis (3*a*), and the differences in the vertical angle (v2) of said beam axis (3*a*), and stores said variations in a memory. At a second instance (t2) said control unit (8) utilises the time difference dt between said initial instance (t1) and said second instance (t2) and calculates the angle velocities of said horizontal angle (v1) and said vertical angle (v2) of said beam axis. By dividing said horizontal angle (v1) of said beam axis (3*a*) by said time difference dt one obtains a mean value for the horizontal angle velocity (Vv1) of said beam axis (3*a*), and by dividing said vertical angle (v2) of said beam axis (3*a*) by said time difference dt one obtains a mean value for the vertical angle velocity (Vv2) of said beam axis. At a third instance (t3) said control unit (8) alters said horizontal angle by said horizontal angle velocity (Vv1), and said vertical angle (v2) by said vertical angle velocity (Vv2). By this embodiment of the invention said searchlight may follow an object moving in both a straight and curved path.

According to a further preferred method according to the invention, the method will comprise synchronisation and coordination of searches by means of two or more searchlights (3, 3', . . . ) arranged according to the invention on the same vessel (1), see FIG. 12_1. An alternative further preferred embodiment according to the invention comprises synchronisation or coordination of at least two searchlights (1, 1', . . . ) which are situated on different vessels (1, 1', . . . ) in which said vessels (1, 1', . . . ) search their respective geographic areas, see FIG. 12_2.

During searches for objects or persons in large areas it is practical to coordinate several searchlights (3) according to the invention on the same vessel (1), or searchlights (3) situated on several vessels (1), so that the search area is searched as effectively, quickly and accurately as possible. The search is performed by dividing the search area into n sub-domains, where n is larger than or equal to two, and where n is equal to the number of searchlights (3) which are desired to be synchronised. Each sub-domain is bounded by a left constraint and a right constraint in which each of said searchlights (3) according to the invention is arranged for performing a desired part of a search by means of a pre-stored pattern, a recorded pattern, or by said operator (20) controlling the orientation of said beam axis (3*a*) within its assigned sub domain manually, for instance by means of a control stick, or so called joy-stick.

According to a further preferred method according to the invention, said method will comprise the possibility for said operator (20) while performing a sweep search, both using pre-stored patterns, recorded patterns, or manually performed searches, to mark off illuminated movable or fixed points (2*p*) during said search. Said control unit (8) will be able to store said marked off movable or fixed points (2*p*) in an internal or external memory. Said control unit (8) may later at a desired instance retrieve the position of said points from said memory, and direct said searchlight towards these points.

Modelling of a Search Situation in which Said Searchlight According the Present Invention is Used.

To illustrate in which manner said searchlight (3) according to the present invention functions, the same starting point for the movements of said vessel (calculation example 1), and also said vessels heading and velocity (calculation example 2) as shown in the description of the prior art. After computation according to calculation example 1 one achieves the following; FIG. 19 shows the movements of said vessel (1) in pitch, roll and yaw-movement, FIG. 26 shows the resulting calculated angles (4*a*, 4*b*) of said beam axis (3*a*) in which said beam axis intersects with the water surface in a point, whereas FIG. 28 shows said vessels (1) position, given by a cross, and the point where said beam axis (3*a*) intersects with the water surface. The point which said beam axis illuminates is completely fixed during the calculation time span, and coincides with said point (2*p*), and this illustrates that a searchlight according to the present invention is adapted to actually illuminate one and the same point on the sea when it is used in searches. Our calculation example shows an idealised response from said searchlight and its control system, whereas there in a real implementation would have to occur mechanical play and delays which are caused by sensor inaccuracies as well as other sources of error.

After computation according to the starting point for computation example 2, FIG. 21 shows that according to a preferred embodiment of the invention said searchlight (3) will alter the direction of said beam axis (3*a*) to compensate for said searchlights (3) movement in space due to the pitch, roll, yaw and heave movement of said vessel as well as the placement of said searchlight on said vessel (1), to be able to keep the intersection point of said beam axis (3*a*) with the water surface at the same point (FIG. 22). This point coincides with the desired point (2*p*) and said searchlight according to the invention is therefore suitable.

FIG. 27 shows that according to the preferred embodiment of the invention said searchlight (3) would need to change the direction of said beam axis (3*a*) in order to compensate for the displacement of said searchlight (3) due to the pitch, roll, yaw, heave, surge and swing movements of said vessel (1), as well as the placement of said searchlight on said vessel (1), to be able to maintain the intersection point of said beam axis (3*a*) with the water surface in the same point (FIG. 22).

Our calculation example again shows an idealised response from said searchlight and its control system, whereas there in a real implementation would have to occur mechanical play and delays which are caused by sensor inaccuracies as well as other sources of error.

COMPONENT LIST

1 vessel
2 object (person or item) in the sea
2*p* the point or position at which said object is situated, in mid sea level with respect to waves
3 searchlight, or only searchlight, floodlight (or laser light)
  3*a* searchlight axis, beam axis
  3*b* light beam suspension
4 heading sensors on searchlight
  4*a* angle about vertical axis (vertical angle, the beams gradient, etc)
  4*b* angle about horizontal axis (horizontal angle, azimuth angle, etc)
h1 said searchlights' (3) height above the sea
h2 said searchlights' (3) height above or below said vessels base plane
h3 the height of said vessels (1) base plane said above the sea
5 motors for movement of searchlight
5*a* motor for rotating about said vertical axis; ("horizontal motor")
5*b* motor for rotating about said horizontal axis; ("perpendicular axis")
6 Sensors for vessel movements
  6*a* heave sensor
  6*b* roll sensor

6*c* pitch sensor
  6*d* yaw sensor
  6*e* surge sensor
  6*f* swing/sway sensor
7 sensors for vessel position
  7*a* GPS receiver or the like, Galileo receiver with computation unit
  7*b* accelerometers
  7*c* radar, position given by distance and direction from point with given position
8 control unit for receiving sensor signals 17 from 7 and 6 and to furnish control signals to motors 5*a*, 5*b* for rotation about said vertical axis and horizontal axis
9 control signals to engines 5*a*, 5*b*
15 rotational axes for said searchlight
  15*a* perpendicular axis perpendicular to a base plane (16)
  15*b* base plane parallel axis about which said beam axis (3*a*) is tilted with respect to said base plane
16 base plane for the mount of said searchlight (3), fixed with respect to said vessel (1).
16*r* reference direction in said base plane (16)
16*f*1 said vessels longitudinal axis
16*f*2 said vessels transversal axis
16*f*3 said vessels perpendicular axis
17 sensor signals
18 camera arranged for wholly or partially continuous recording of images
19 search pattern
20 operator
v1 the angle of said beam axis projected down onto said base plane (16) referred to said reference direction (16*r*)
v2 the angle of said beam axis referred to said perpendicular axis (15*a*) ("perpendicular axis") for said searchlight)
r distance from a point
POA1, POA2, . . . , POAn a line a distance r from a point
gp1, gp2, . . . , gpN global points or positions
Va1, Va2, . . . , VaN Vector which is spanned out by said beam axis at the instance t1, t2, . . . , tN.

The invention claimed is:

1. A searchlight (3) for use on a moving vessel (1), in which said searchlight (3) is arranged for sending a light beam with a beam axis (3*a*) which is arranged for illuminating a point or position (2*p*) of an object (2) which is situated on the surface of the sea, in which said searchlight (3) is arranged in a given elevation (h1) above the sea and is revolvable about a perpendicular axis (15*a*) with respect to a base plane (16) having a reference direction (16*r*) and a base plane parallel axis (15*b*) parallel to said base plane (16);

in which said searchlight (3) beam axis (3*a*) is arranged for being revolved about said perpendicular axis (15*a*) and said base plane parallel axis (15*b*) for steering said beam axis (3*a*) towards said point (2*p*);

in which said searchlight (3) is provided with a first motor (5*a*) for movement of said beam axis (3*a*) about said perpendicular axis (15*a*), and a second motor (5*b*) for movement of said beam axis (3*a*) about said base plane parallel axis (15*b*);

characterised by the following features:

a control unit (8) arranged for receiving measurements from the following devices:

a first heading sensor (4*a*) for measuring an angle (v1) of said beam axis (3*a*) projected down onto said base plane (16) with respect to said reference direction (16*r*);

a second heading sensor (4*b*) for measuring an angle (v2) of said beam axis (3*a*) with respect to said perpendicular axis (15*a*);

vessel movement sensors (6) for measuring said vessels (1) rotational angles, in which said vessel movement sensors (6) comprise one or more of a yaw sensor (6*d*), a roll sensor (6*b*) and a pitch sensor (6*c*);

a position sensor, for instance a GPS-receiver (7) which calculates geographic latitude (7*a*) and longitude (7*b*) in a coordinate system;

a heave sensor (6*a*) arranged for calculating said vessels (1) heave position;

in which said control unit (8) on the basis of the received measurements of said vessels (1) movements, said vessels (1) position, and said searchlight (3) orientation and position on said vessel (1) is further arranged for calculating and furnishing control signals (9) to said motors (5*a*, 5*b*) for rotating said beam axis (3*a*) about said perpendicular axis (15*a*) and said base plane parallel axis (15*b*), in order for said beam axis (3*a*) to be directed towards said desired point (2*p*) on the sea while said vessel (1) is in movement.

2. The searchlight according to claim 1 in which said control unit (8) is also arranged for receiving signals from sensors (6) for translatory movements, comprising a surge sensor (6*e*) and a sway sensor (6*f*).

3. The searchlight (3) according to claim 1, in which said vessel (1) is a manned or unmanned marine vessel.

4. The searchlight (3) according to claim 1, in which said vessel is a helicopter.

5. The searchlight (3) according to claim 1, in which said searchlight comprises a camera (18) arranged for continuous or partly continuous recording (18*a*) of images (18*b*).

6. The searchlight (3) according to claim 1, comprising measurement or computation of said vessels heave position on the basis of heave sensors (6*a*) at the instances (t1) and (t2) for computation of which new angles ($v1_2$, $v2_2$) said beam axis must take up to be directed towards said same point (2*p*) on the sea at the instances (t1) and (t2).

7. The searchlight according to claim 1, comprising measurement or computation of said vessels geographic position at the instances (t1) and (t2) for computation of which new angles ($v1_2$, $v2_2$) said beam axis must take up to be directed towards said same point (2*p*) on the sea, as given in geographical coordinates, at the instances (t1) and (t2).

8. Method for searches from a vessel (1) having a searchlight (3) with a light beam having a beam axis (3*a*), characterised in that said method comprises the following steps:

computation in a control unit (8) of an angle (v1) of said beam axis' (3*a*) as projected down onto a base plane (16) with respect to a reference direction (16*r*), by using a first heading sensor (4*a*), in which said base plane (16) is fixed with respect to said vessel (1) and preferably parallel to the plane formed by said vessels' (1) longitudinal axis (16/1) and transversal axis (16/2), and in which a perpendicular axis (15*a*) of said searchlight (3) is parallel to said vessels' (1) vertical axis (16/3), and in which said axis (15*b*) is horizontal to a plane defined by said vessels horizontal axes (16/1, 16/2), and in which said vertical axis (16/3) is vertical at said vessels (1) neutral stationary position and rotates with said vessels (1) rotational movements, computation in said control unit (8) of said beam axis' (3*a*) angle (v2) with respect to a perpendicular axis (15*a*) to said base plane (16) by means of a second heading sensor (4*b*), reception in said control unit (8) of said searchlight's (3) height over the sea, registration of said vessels (1) rotational and translatory movements by means of a vessel movement sensors (6), registration of said vessels (1) geographical position in a coordinate system by means of a position measurer, e.g. a GPS-receiver (7*a*), computation in said control unit (8) of control signals (9) to motors (5*a*, 5*b*) for rotation of said beam axis (3*a*) about said perpendicular axis (15*a*) and said ground plane parallel axis (15*b*) so as for compensating for said vessels' (1) movements so as for said beam axis (3*a*) being held towards a desired fixed or movable point (2*p*) when said vessel (1) is moving.

9. A method according to claim 8 in which said desired point (2*p*) is a fixed geographic location at sea.

10. A method according to claim 8 in which said desired point (2*p*) is a movable geographic location at sea.

11. A method according to claim 8 in which said desired point (2*p*) is a fixed geographic location on land.

12. A method according to claim 8 in which said searchlight receives geographic coordinates defining a point (2*p*) from an index, memory or similar storage device, or geographic coordinates defined by an operator (20).

13. A method according to claim 12, in which said searchlight (3) directs said beam axis (3*a*) towards said point (2*p*) if said vessels (1) position is a distance from said point (2*p*) which is lesser or equal to a given distance r.

14. A method according to claim 8 in which said searchlight (3) beam axis (3*a*) is directed towards the object (2) at a first instance (t1) and a second instance (t2), and in which said control unit computes the difference between the positions ($2p_{t1}$) and ($2p_{t2}$) and on the basis of this computation computes an object velocity ($V_2$) and stores this in a memory or other storage device for at a later instance ($t_3$) using said velocity ($V_2$) for computing said objects (2) position ($2p_{t3}$).

15. A method according to claim (8) in which said position (2*p*) is changed according to a given search pattern (19), in which said search pattern (19) may be spiral shaped, rectangular line shaped, or describe a different shape, or in which said search pattern (19) is defined by an operator (20).

16. The method according to claim 15 in which said search pattern (19) is bounded by geographic points (gp1, gp2, . . . , gpn) which are furnished to said control system (8).

17. The method according to claim 15 in which an operator (20) during the search period marks out one or more points ($2p_1$, $2p_2$, . . . , $2p_n$) and in which said points are stored in a memory or other storage device.

18. The method according to claim 8 in which two or more searchlights ($3_1$, $3_2$, . . . ) coordinate their search patterns (19) so as for a second searchlight ($3_2$) to take over the illumination of said point (2*p*) if said point falls outside the area which is physically illuminable by a first searchlight ($3_1$) or the area which is defined to be said first searchlight ($3_1$) search area.

* * * * *